United States Patent [19]

Naoe

[11] Patent Number: 5,566,300
[45] Date of Patent: Oct. 15, 1996

[54] MICROCOMPUTER WITH BUILT IN DEBUGGING CAPABILITY

[75] Inventor: Yukihisa Naoe, Hyogo-ken, Japan

[73] Assignee: Mitsubishi Denki Kabushiki Kaisha, Tokyo, Japan

[21] Appl. No.: 413,013

[22] Filed: Mar. 29, 1995

[30] Foreign Application Priority Data

Mar. 29, 1994 [JP] Japan ................................ 6-058393

[51] Int. Cl.[6] ............................................. G01R 31/28
[52] U.S. Cl. ................................ 395/183.06; 371/22.6
[58] Field of Search ....................... 395/575, 183.04, 395/183.06, 325, 183.01, 310; 371/22.6, 29.1, 22.5, 29.1, 22.1; 364/267, 267.91

[56] References Cited

U.S. PATENT DOCUMENTS

| | | | |
|---|---|---|---|
| 4,079,449 | 3/1978 | Mercurio et al. | 364/200 |
| 4,386,410 | 5/1983 | Pandya et al. | 364/518 |
| 4,639,721 | 1/1987 | Eto et al. | 340/747 |
| 4,646,077 | 2/1987 | Culley | 340/748 |
| 4,744,084 | 5/1988 | Beck et al. | 371/23 |
| 4,792,918 | 12/1988 | Hirase et al. | 371/29.1 |
| 5,072,411 | 12/1991 | Yamaki | 395/700 |

FOREIGN PATENT DOCUMENTS 61-223514  10/1986  Japan.

Primary Examiner—Robert W. Beausoliel, Jr.
Assistant Examiner—Albert Décady
Attorney, Agent, or Firm—Lowe, Price, LeBlanc & Becker

[57] ABSTRACT

A debug instruction program is executed to enable a latch contents setting register to select the address of a specified part of a memory to be monitored. The selected address is given to a latch timing controller 18, and the internal state of the specified part of memory is supplied to a display contents latch unit according to information from an address bus and a bus timing control signal. The display contents latch unit latches the internal state and supplies it to a display device so that the internal state of memory can be identified and debugged.

19 Claims, 32 Drawing Sheets

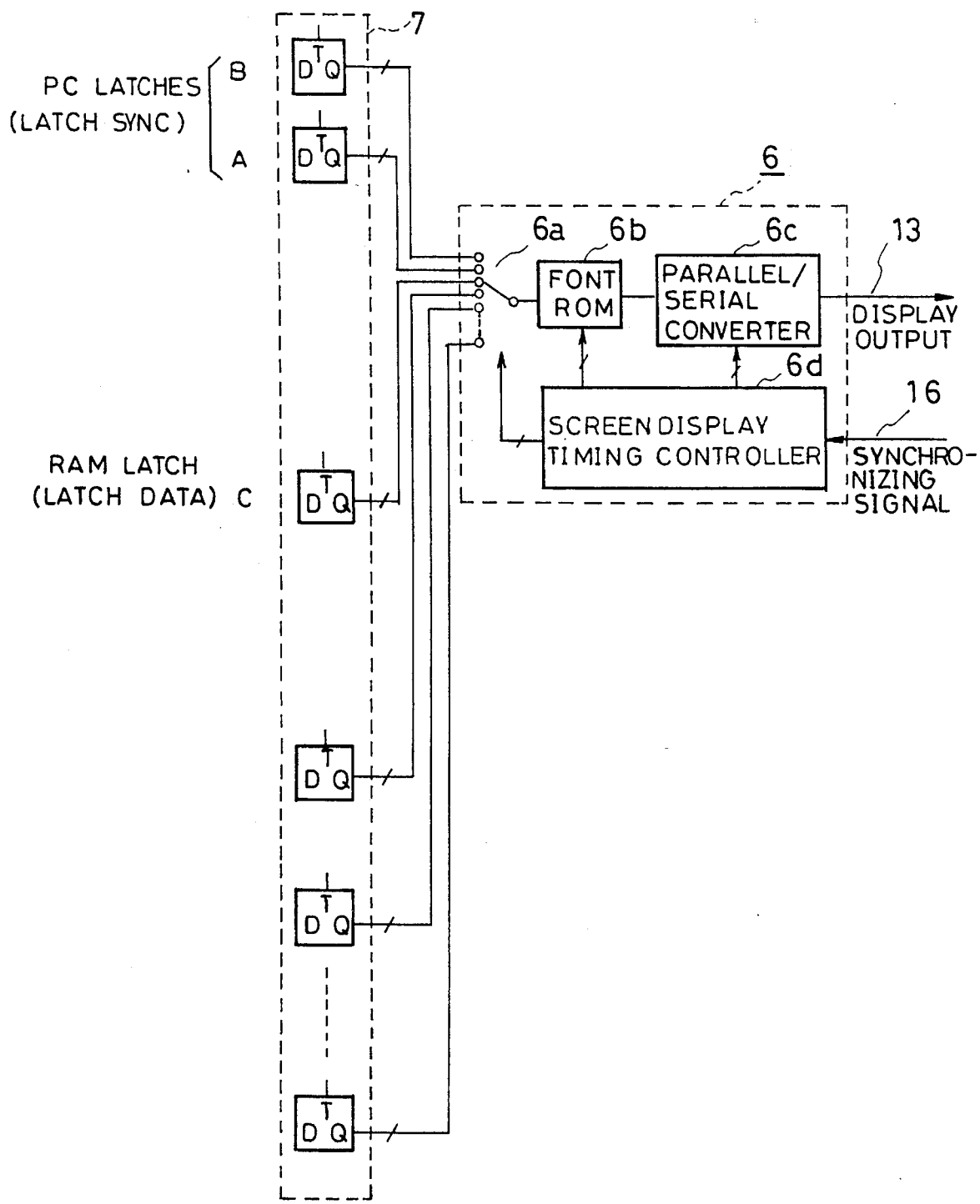

EXEMPLARY DISPLAY
ON TV SCREEN

DISPLAY CONTENTS
LATCH UNIT

FONT ROM

SEL1 TO SELn ARE WRITE SIGNALS FOR WRITING DATA TO EACH LATCH ACCORDING TO SOFTWARE.

DISPLAY DEVICE

FONT ROM

LDM #DATA, ADL (∅∅ ADL) ← DATA

A,B ARE NAMES OF RAMS TO BE MONITORED

LDM #DATA, ADL
(00 ADL) ← DATA

MEMORY MAP

TIMING CHART

MICROCOMPUTER WITH BUILT IN DEBUGGING CAPABILITY

BACKGROUND OF THE INVENTION

1. Field of the Invention

This invention relates to a microcomputer which enables data on the internal operation of an LSI and on the states of internal storage devices to be supplied to the outside.

2. Description of the Prior Art

Generally speaking, an important program for driving a microcomputer itself is stored in the ROM of the microcomputer. If the contents of this program can be displayed on a monitor for visual observation, it is possible to check or debug the contents on the monitor.

If application programs stored in a RAM and data stored in a register can also be displayed on the monitor, it is possible to check if these stored programs and data are correct.

Heretofore, a single-chip microcomputer with built-in OSD (On Screen Display) as shown in FIG. 25 has been available as a microcomputer which enables the contents of a storage device such as a ROM, RAM and register to be displayed on a monitor. In the figure, denoted at 1A is a single-chip microcomputer (referred to as "microcomputer" hereinafter) which incorporates a program counter 2, a register 3, a ROM 4 for storing programs, a RAM 5 for storing data required for processing, a display contents latch unit 7 including a plurality of latch circuits for latching digital values which appear on an address bus 9 and a data bus 8, and a display controller 6 for converting the contents of the display contents latch unit 7 into character and graphic data and supplying the converted data to an external display device. The display contents latch unit 7, the register 3, the ROM 4 and the RAM 5 are connected to the data bus 8 and the address bus 9. The directions of the arrows of the data bus 8 and the address bus 9 indicate the directions of the inputs and outputs of signals (address data and data) on these buses. Denoted at 11 is a central processing unit (CPU) for controlling the buses 8 and 9 internal to the microcomputer 1A, which generates a bus timing control signal 12 to the outside of the microcomputer 1A. The program counter (PC) 2 is connected to the CPU 11 and stores the address of an instruction being currently executed. Denoted at 13 is the display output of the display controller 6, 14 an address bus output signal for supplying the contents of the address bus 9 within the microcomputer 1A to the outside of the microcomputer 1A, and 15 a data bus output signal for supplying the contents of the data bus 8 within the microcomputer 1A to the outside of the microcomputer 1A. Reference numeral 16 represents the synchronizing signal of a TV screen to be applied to the display controller 6 from the outside of the microcomputer 1A. Since output signals 12, 14 and 15 are concurrent with one another, the microcomputer 1A uses a multi-axis cable and is provided with a large number of pins as terminals.

A description is subsequently given of the operation of this microcomputer. The register 3, the ROM 4 and the RAM 5 are each connected to the data bus 8 and the address bus 9 and information is transmitted under the control of the CPU 11. FIG. 26 is a timing chart of an example of the operation. Addresses and data to be written to or read from the program counter 2, register 3, ROM 4 and RAM 5 appear on the address bus 9 and the data bus 8 on a time-division basis, and are specified by the bus timing control signal 12.

A reference clock φ signal 12a, a SYNC signal 12b, a $\overline{WR}$ signal 12c (bar indicates that the signal is active when it is at a low level), and an $\overline{RD}$ signal 12d shown in FIG. 26 are supplied from the CPU 11 as the bus timing control signal 12. A leading address 23a of an instruction code which appears on the address bus 9 is indicated by a fall in the SYNC signal 12b and is the contents of the program counter 2 supplied from the CPU 11. The instruction OP code, LDM, of the program counter 2 shown in FIG. 32 is an instruction shown at the bottom of the figure. In this case, data 25 appearing on the address bus 9 and to be written to the RAM 5 at an address 24 is DATAx which is written upon a rise in the $\overline{WR}$ signal 12c.

ADL refers to the low-order 8 bits of an address and ADH the high-order 8 bits of the address. The clock φ signal is the reference clock signal of an instruction, the SYNC signal is a timing signal indicating the leading address of an instruction code, the $\overline{WR}$ signal is a write timing signal for writing data to the register 3 and the RAM 5, and the $\overline{RD}$ signal is a read timing signal for reading data from the register 3, the ROM 4 and the RAM 5. The display contents latch unit 7 is connected to the address bus 9 and the data bus 8 as is the RAM 5 so as to enable data to be written from and read out to the data bus 8 by the CPU 11. The written (latched) contents of the display contents latch unit 7 are applied to the display controller 6 which in turn converts the output data of the display contents latch unit 7 into character and graphic data and supplies the converted data to the outside of the microcomputer 1A as the display output 13 in response to the synchronizing signal 16.

Meanwhile, there are two methods for supplying the contents of the register 3, ROM 4 and RAM 5, and the contents 23a of the program counter 2 through the CPU 11 to the outside of the microcomputer 1A. One of the methods is to supply a bus timing control signal 12, address bus output signal 14, and data bus output signal 15 to the outside of the microcomputer 1A and identify these contents according to the timing relationship among these three signals. In this first method, there are a large number of pins on the microcomputer 1A as shown in FIG. 27, and wiring becomes complicated for debugging. Furthermore, an additional monitor c connected to a debugger d is required for debugging. In this case, a program for instructing debugging is an application program L as shown in FIG. 28.

Denoted at letter a in FIG. 27 is a TV monitor connected to the microcomputer 1A. A timing output line 12, display output line 13, address output line 14 and data output line 15 extending from a large number of output signal pins provided on the microcomputer 1A are connected to the debugger d.

The second method is to transfer the contents of the program counter 2, register 3, ROM 4 and RAM 5 to the display contents latch unit 7 via the data bus 8 by means of software and identify these contents from the display output 13. FIG. 29 shows a TV monitor a connected to the microcomputer 1A, employing this second method.

In this case, although the number of output signal pins of the microcomputer 1A does not increase, a debug instruction program is required, which includes a program W for reading a test switch (test SW) and transfer programs i to k for transferring the contents of the RAM 5 to the display contents latch unit 7, thereby increasing the program volume. This means that an external storage device g for storing the debug instruction program needs to be installed on a substrate f, or the ROM 4 is occupied with the debug instruction program. In addition, the CPU 11 must perform transfer processing Z (processing of transferring the contents of the RAM 5 specified by the test switch to the display contents latch unit 7) according to the transfer programs i to k, thereby increasing the load on the CPU 11.

In other words, the method in which the signal output pins are connected to the debugger requires no special software for debugging because of hardware processing, but takes a lot of time and labor for preparation for observation such as wiring.

On the other hand, the second method which employs software processing requires the transfer programs i to k, resulting in an increased program volume and a greater load on the CPU 11 (transfer processing Z).

The expression "reading test switch (W)" used in FIG. 30 means a read operation of a program for switching the screen of the TV monitor a from a normal mode to a test mode when the power switch, channel switch and volume switch of a TV are depressed at the same time and a program which enables a RAM (A) to be specified by depressing the channel switch and a RAM (B) to be specified by depressing the volume switch thereafter.

Therefore, it is possible to instruct debugging by specifying a RAM to be monitored with the test switch and transferring contents to be debugged to the display contents latch unit 7 by means of the CPU 11.

Besides the microcomputer with built-in display controller described above, a microcomputer with built-in D/A converter is commonly known. An example of this microcomputer with built-in D/A converter is described below with reference to FIGS.31 to 36.

FIG. 31 is a block diagram of the internal configuration of the single-chip microcomputer with built-in D/A converter. In the figure, a program counter 2, register 3, ROM 4 and RAM 5 are incorporated in the microcomputer 1B, and connected to the data bus 8 and the address bus 9. The directions of the arrows of the data bus 8 and the address bus 9 show the directions of the inputs and outputs of signals (address data and data) on these buses. Denoted at 111 is a bus timing controller for controlling the internal buses 8 and 9 of the microcomputer 1B, and 116 an interrupt controller for controlling interrupt processing in the microcomputer 1B.

Denoted at 16a and 16b are D/A converters incorporated in the microcomputer 1B, which receives inputs 10a and 10b, and supplies outputs 13a and 13b to the outside of the microcomputer 1B. Reference numeral 118 represents an internal state latch unit for selecting the internal states of the microcomputer to be monitored and temporarily storing the selected states, 19 refers to internal state latch unit outputs for supplying the selected ones out of a plurality of the internal states, 120 an internal state monitor/selector for selecting the internal states to be monitored, whose output 21 is applied to the internal state latch unit 118 and a D/A input selector 22 to be described below. Reference numeral 12 represents the output of the bus timing controller 111 which is applied to the internal state latch unit 118, and 22 a D/A input selector for selecting two of the internal state latch unit outputs 19 and supplying the selected outputs to the D/A converters 16a and 16b.

FIG. 33 shows exemplary circuits of the D/A converters 16a and 16b, the internal state monitor/selector 120 and the internal state latch unit 118.

A description is subsequently given of the operations of these units. Two of the internal states to be monitored are selected by the internal state monitor/selector 120. The select control signal controls the internal state latch unit 118 through the output 21 of the internal state monitor/selector 120. The internal state latch unit 118 selects two from among the states of the program counter 2, register 3, ROM 4 and RAM 5 according to information from the address bus 9, the data bus 8 and the bus timing control signal 12 and temporarily stores the two. As for the specification, states at two specific addresses in different blocks among the program counter 2, register 3, ROM 4 and RAM 5 may be selected, or states at two specific addresses in a single block (for example, RAM) may be selected.

A description is given of the exemplary operation of the internal state latch unit 118 with reference to FIG. 32. In the figure, $\phi$, SYNC, $\overline{WR}$ and $\overline{RD}$ represent the bus timing control signals 12a to 12d, ADDR the contents of the address bus 9 and DATA the contents of the data bus 8. In this example, the contents of the program counter 2 and the contents (to be written) of the RAM 5 at an address ADL (low-order address) are selected by the internal state monitor/selector 120. The internal state latch unit 118 latches the value (contents 27a of (PC), contents 27b of (PC+3)) of the program counter 2 which appears on the address bus 9 upon a fall in the SYNC signal, and temporarily stores and supplies LATCH SYNC as one of the internal state latch unit outputs 19. Upon a rise in the $\overline{WR}$ signal, the internal state latch unit 118 also latches the contents DATAx 26 to be written to the RAM 5 at an address ADL, which appear on the data bus 8 when the value of the address bus 9 becomes the address ADL, and temporarily stores and supplies LATCH DATA as another internal state latch unit output 19. In this example, the D/A input selector 22 selects under the control of the internal state monitor/selector output 21 the above two, that is, the state of the program counter 2 (LATCH SYNC) and the state of the RAM (LATCH DATA) at the address ADL among from the states of the internal state latch unit outputs 19, and supplies these as the two D/A converter inputs 10a and 10b, respectively. The two D/A converters 16a and 16b convert these inputs 10a and 10b (digital values) into analog values and supplies the analog values to the outside of the microcomputer as the D/A converter outputs 13a and 13b, respectively.

A description is subsequently given of the operation of the microcomputer when a program is actually executed.

FIG. 34(a) and (b) are flow charts of a sample program. In the main routine (MAIN) of FIG. 34(a), the internal state monitor/selector 120 is set so that the state of the program counter 2 is supplied as the D/A converter output 13a and the contents of the RAM 5 at an address "0000" are supplied as the D/A converter output 13b (step 28). Thereafter, a predetermined time period is awaited (step 29), and the contents of the RAM 5 (labelled COUNTER) at the address "0000" is incremented by one (step 30). These steps 29 and 30 are looped eternally (step 29→step 30→step 29 . . . ). On the other hand, in the general interrupt processing (INT) of FIG. 34(b), the contents of COUNTER are reset to "0" each time an external interrupt input 17 is detected as shown in FIG. 34(b) (step 31). When the above-mentioned programs and COUNTER data are allocated to the addresses of MEMORY MAP shown in FIG. 35 and the programs are executed, waveforms as shown in FIG. 36 are output as the D/A converter outputs 13a and 13b. Reference numeral 32 represents a variation range of COUNTER (address 0000+i), 33 an address range of a main routine (F000 to F020), and 34 an address range of interrupt processing (FF00 to FF20). It is easily observed from the outputs 13a and 13b of the D/A converters 16a and 16b on an oscilloscope that each time an interrupt is generated, an address jump occurs and the contents of COUNTER are cleared.

Since the single-chip microcomputer with built-in display controller of the prior art is constructed as described above, there have been two methods for supplying data on the internal states of the microcomputer including the program counter to the outside: the first method is to supply the address bus signal, the data bus signal and the bus timing control signal, and the second method is to transfer desired data to the display contents latch unit according to the instruction of software and identify the data from the output of the display controller.

However, according to the first method, a large number of signal pins are required, thus imposing a volume problem on a high-density small-sized single-chip microcomputer which has a limitation on the number of pins. Since data are obtained directly from the address bus signal, the data bus signal and the bus timing control signal, and not from the output of the display controller for the observation of the internal states, the measured signals are binary pulse signals and a sequence of pulses must be observed. Therefore, it is difficult to identify the internal states of the microcomputer. In other words, since use cannot be made of the advantage of the display controller at all, the microcomputer cannot be used effectively.

The second method has the problem that the program volume is increased as additional software is used for supplying the contents to the outside of the microcomputer on a regular basis.

In other words, to instruct debugging, it is necessary to transfer the contents to the display contents latch unit by means of the CPU. For this purpose, the transfer programs i to k for performing the transfer processing Z of FIG. 30 must be added, resulting in a huge program volume and a greater load on the CPU due to the transfer processing Z.

The microcomputer with built-in D/A converter shown in FIGS. 31 to 36 does not comprise means for instructing debugging. Although this means does not require the transfer programs i to k of FIG. 30, means for setting the contents to be debugged in the internal state monitor/selector 120 is required instead. Furthermore, since an analog signal is supplied from the microcomputer, it is difficult to observe the contents using an oscilloscope or voltmeter when characters or accurate numerical values are to be displayed on a monitor. D/A converters which occupy a large space are required for observation. Since an apparatus (such as an oscilloscope and voltmeter) separate from an application apparatus is used for observation and display when an application program is debugged, it is difficult to observe both the operation state of the application apparatus and the internal states (such as a RAM value) of the microcomputer simultaneously, and it is necessary to prepare another measurement instrument for observation. Since at least one output is required for each observation data, a large number of D/A converters and output terminals are needed for a large number of observation data. The capacity of the D/A converter is limited to 10 bits from a viewpoint of semiconductor technology when it is incorporated into a microcomputer. Therefore, when internal data consists of many bits (plural bits), observation is difficult.

SUMMARY OF THE INVENTION

This invention is made to solve the above-described problems, and a first object of the invention is to achieve a microcomputer with built-in display controller which enables the contents of a program counter, register, ROM, RAM and other elements within the microcomputer to be supplied to the outside of the microcomputer by adding a small number of pins and for data to be observed with ease when data to be displayed on the monitor are characters and accurate numerical values, requires only a small number of equipment for observation, and facilitates data observation even if internal data is multi-bit data.

A second object of the invention is to achieve a microcomputer with built-in display controller capable of instructing debugging in addition to the above-described first object of the invention.

The microcomputer claimed in claim 1 comprises the display controller 6, the latch contents setting register 20 connected to the address bus 9 and the data bus 8, for specifying contents to be monitored in the display contents latch unit 7, and the latch timing controller 18 controlled by the latch contents setting register 20, for supplying a latch timing signal to the display contents latch unit 7.

The microcomputer claimed in claim 2 comprises the display controller 6, the latch contents setting register 20 connected to the address bus 9 and the data bus 8, for specifying contents to be debugged in the display contents latch unit 7, the latch timing controller 18 controlled by the latch contents setting register 20, for supplying a latch timing signal to the display contents latch unit 7, and debug instructing means for activating the latch contents setting register 20 to instruct debugging.

The microcomputer claimed in claim 3 is arranged such that the debug instructing means is a debug instruction program X including a switch setting program for setting the test switch so as to specify a storage device having contents to be debugged and a monitor program for setting the storage address of the contents in the latch contents setting register.

The microcomputer claimed in claim 4 is arranged such that the debug instructing means is an application program including a switch setting program for setting the test switch so as to specify a storage device having contents to be debugged and an instruction for writing program contents directly to the display contents latch unit and the contents of an application program are directly written to the display contents latch unit by this application program.

The microcomputer claimed in claim 5 is arranged such that latch control means (IC2, IC4, IC12, IC20) for generating a latch trigger signal to the display contents latch unit 7 according to a latch timing signal supplied from the latch timing controller 18 and a selection signal (SEL1 to SELn) set by the debug instructing means are provided between the latch timing controller 18 and the display contents latch unit 7.

The microcomputer claimed in claim 6 is arranged such that encoders E1 and E2 for selecting and supplying some of a plurality of bits of the address bus 9 or the data bus 8 based on the output signal of the latch timing controller 18 and supplying a fixed value for the other bits are provided between the display contents latch unit 7 and the address bus 9 and between the display contents latch unit 7 and the data bus 8.

The microcomputer claimed in claims 7 and 8 is arranged such that the display controller 6 is composed of a latch selection switch 6a for selecting one of a plurality of latch circuits included in the display contents latch unit 7, a high-order/low-order selection switch 6e for selecting and supplying some bits of multi-bit digital data which is the output signal of the latch selection switch 6a, a font ROM 6b for using the output signal of this high-order/low-order selection switch 6e as part of an address, and a screen display timing controller 6d for controlling the timings of the latch selection switch 6a, the high-order/low-order selection switch 6e and the font ROM 6b and supplying a display output.

The microcomputer claimed in claims 9 and 10 is arranged such that an on-screen display controller for displaying on a TV screen is used as the display controller 6 and is composed of a latch selection switch 6a for selecting one of a plurality of latch circuits of the display contents latch unit 7, a font ROM 6b for receiving the output signal of this latch selection switch 6a and supplying parallel data, a parallel/serial converter 6c for receiving and converting the parallel data which is the output signal of the font ROM 6b into serial data and supplying the serial data, a bar display counter 6f for receiving the contents of the latch selection switch 6a, counting down a clock signal, and supplying significant pulses until an underflow occurs, a screen display timing controller 6d synchronous with a synchronizing signal supplied from the outside, for controlling the bar display counter 6f and supplying a count-down clock signal, controlling the parallel/serial converter 6c and supplying a shift clock signal, and controlling the latch selection switch 6a and the font ROM 6b, and an OR gate 6g for ORing the output signal of the parallel/serial converter 6c and the output signal of the bar display counter 6f and supplying this OR to the outside as a display output.

According to claim 1, some arbitrary addresses to be monitored in a program counter and a storage device such as a register, ROM and RAM are specified in the latch contents setting register by software, and thereby the display contents latch unit latches the contents of the program counter and the contents of a storage device to be monitored, which are converted into character and graphic data by the display controller for output to a display device.

According to claim 2, the contents to be debugged by the debug instructing means are latched by the display contents latch unit, converted into character and graphic data by the display controller for output to a display device, and debugged later.

According to claim 3, the test switch is set by the switch setting program, and operated to specify a storage device having contents to be debugged. The storage address of the contents to be debugged is set in the latch contents setting register by the monitor program to enable the display contents latch unit to latch the contents to be debugged. The latched contents are converted into character and graphic data by the display controller for output to a display device and debugged later.

According to claim 4, the debug instructing means is an application program including the switch setting program and an instruction for writing program contents directly to the display contents latch unit, and the contents of an application program are directly written to the display contents latch unit by this application program.

According to claim 5, the latch control means is activated by a selection signal set by the debug instructing means and a timing signal supplied from the latch timing controller to generate a latch trigger signal, by which the contents to be debugged are latched by the display contents latch unit.

According to claim 6, the encoders select and supply some of a plurality of bits of the address bus or the data bus and supply a fixed value for the other bits.

According to claims 7 and 8, the display controller selects the output of a latch circuit of the display contents latch unit, which latches the contents of the program counter, for example, by means of the latch selection switch, selects low-order bits, for example, of the output by means of the low-order/high-order selection switch, and supplies the selected bits to the font ROM 6b. The contents of the program counter can be seen by reading the contents of the font ROM.

According to claims 9 and 10, in the display controller, the latch selection switch selects one of a plurality of latch circuits of the display contents latch unit, the font ROM receives the selected signal and supplies it as parallel data, and the parallel/serial converter converts the parallel data into serial data and supplies the serial data. The bar display counter receives the contents of the latch selection switch, counts down a clock signal, and generates significant pulses until an underflow occurs. The screen display timing controller is synchronous with a synchronizing signal supplied from the outside, controls the bar display counter and supplies a count-down clock, controls the parallel/serial converter and supplies a shift clock signal, and controls the latch selection switch and the font ROM. The OR gate ORs the output signal of the parallel/serial converter and the output signal of the bar display counter and supplies the OR as a display output.

The above and other objects, features and advantages of the invention will become more apparent from the following description when taken in conjunction with the accompanying drawings.

BRIEF DESCRIPTION OF THE DRAWINGS

FIG. 12 is a block diagram of the configuration of the display controller of FIG. 1;

DESCRIPTION OF THE PREFERRED EMBODIMENT

Embodiment 1 (claims 1 to 5)

Figure 1:
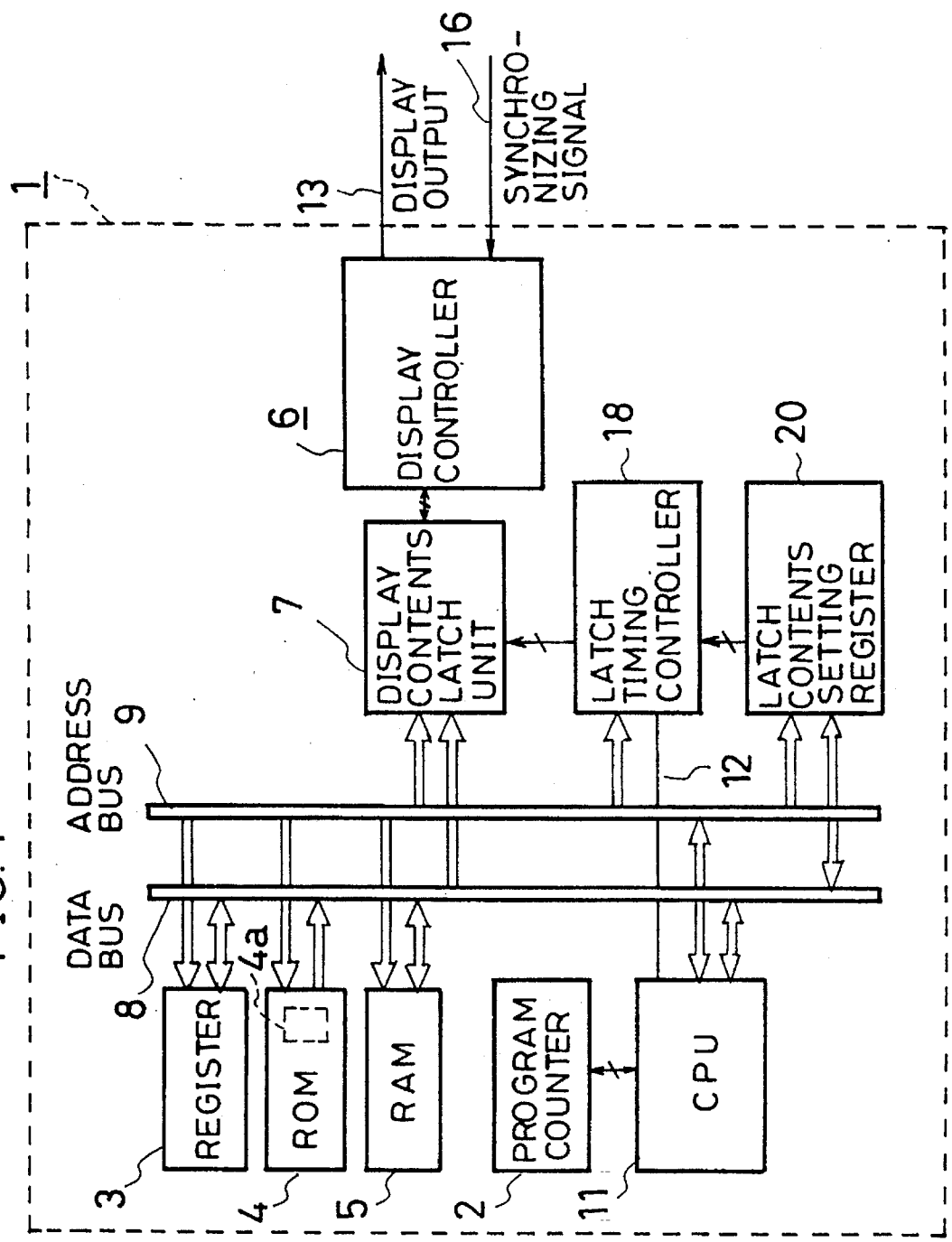
FIG. 1 is a block diagram of the internal configuration of a single-chip microcomputer with built-in OSD according to Embodiment 1 of the present invention.

With reference to the accompanying drawings, Embodiment 1 of the present invention is described hereinunder. FIG. 1 is a block diagram of the internal configuration of a single-chip microcomputer with built-in OSD according to Embodiment 1 of the present invention.

In the figure, the microcomputer 1 incorporates a program counter 2, a register 3, a ROM 4 and a RAM 5. The register 3, ROM 4 and RAM 5 are connected to a data bus 8 and an address bus 9. The directions of arrows of the data bus 8 and the address bus 9 show the directions of the inputs and outputs of signals (address data and data) on these buses.

Reference numeral 11 represents a central processing unit (abbreviated as CPU) for controlling the internal buses 8 and 9, and 2 the program counter connected to the CPU 11.

Reference numeral 6 represents a display controller incorporated in the microcomputer 1, which receives the output signal of the display contents latch unit 7 and supplies a display output 13 to the outside of the microcomputer in synchronism with a synchronizing signal 16 for the TV screen. Reference numeral 7 represents a display contents latch unit for receiving some of the internal states of the microcomputer to be monitored (or debugged), 18 a latch timing controller for providing the display contents latch unit 7 with times when the selected internal states appear on the address bus 9 and the data bus 8, 20 a latch contents setting register for selecting internal states to be monitored (or debugged), and 12 a bus timing control signal supplied from the CPU 11 to the latch timing controller 18.

Figure 2:
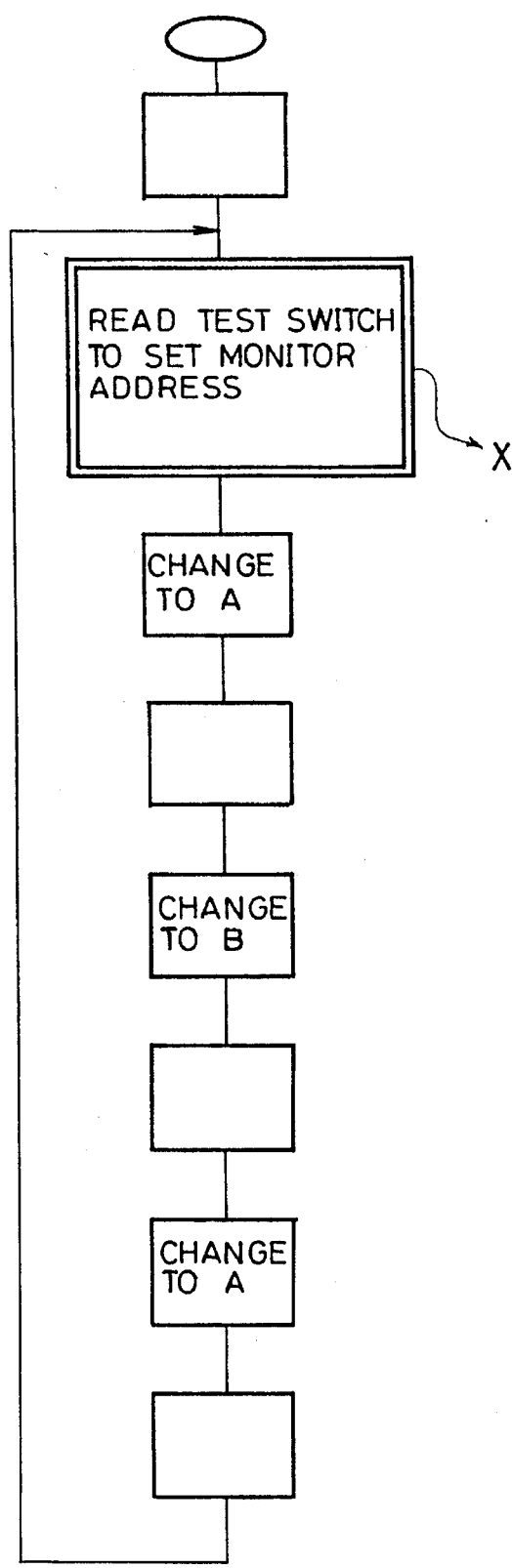
FIG. 2 is a flowchart explaining additional software for debugging according to Embodiment 1.

The ROM 4 has a storage area 4a for storing a debug instruction program X (debug instructing means) including a switch setting program for setting a test switch and a monitor program- Therefore, in this embodiment, the contents of the program counter, register, RAM and ROM are debugged by the debug instruction program X shown in FIG. 2.

Figure 28:
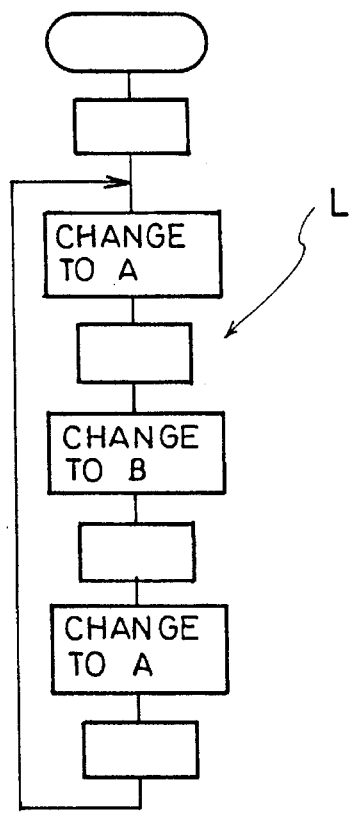
FIG. 28 is a flow chart showing software employed by the first method.
Figure 29:
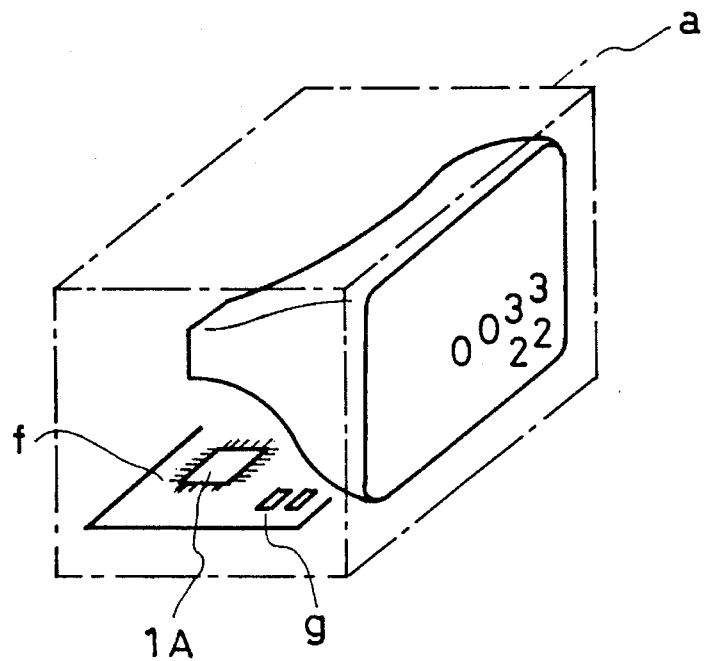
FIG. 29 is a diagram explaining the second method to identify RAM contents in the prior art.
Figure 30:
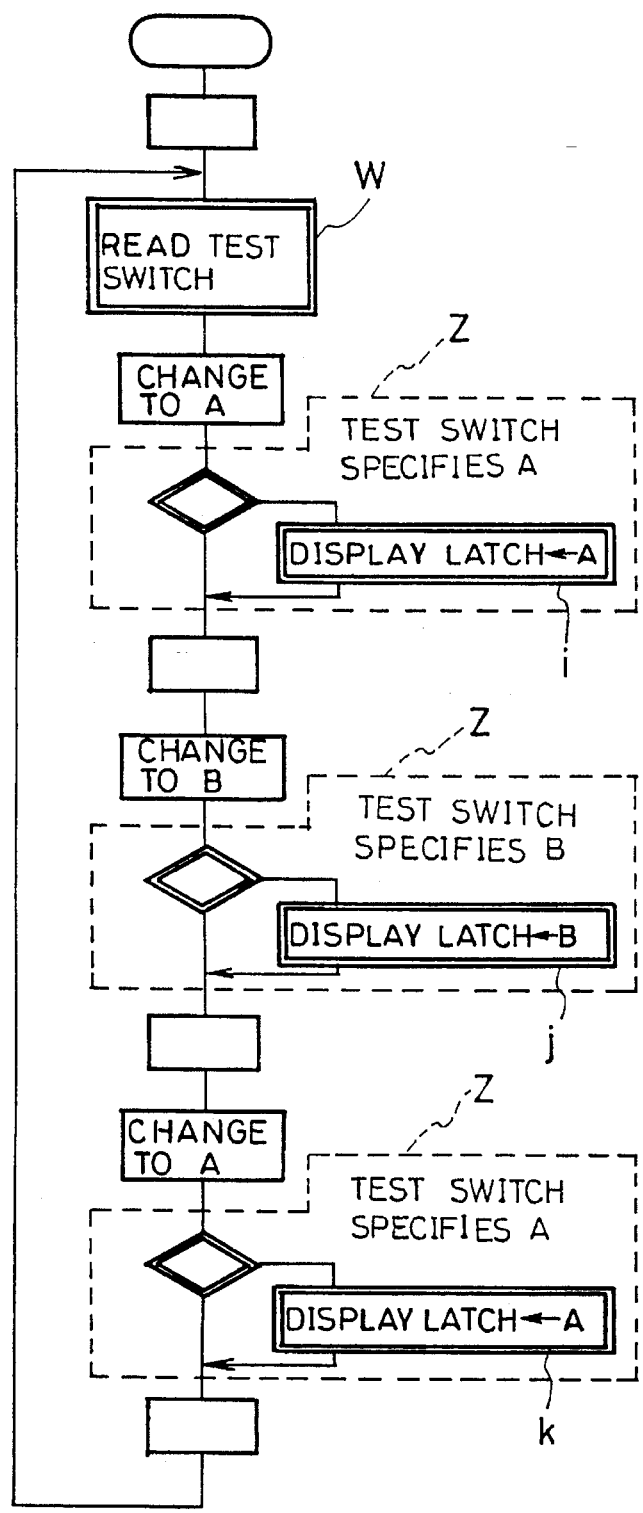
FIG. 30 is a flow chart showing software employed by the second method.
Figure 31:
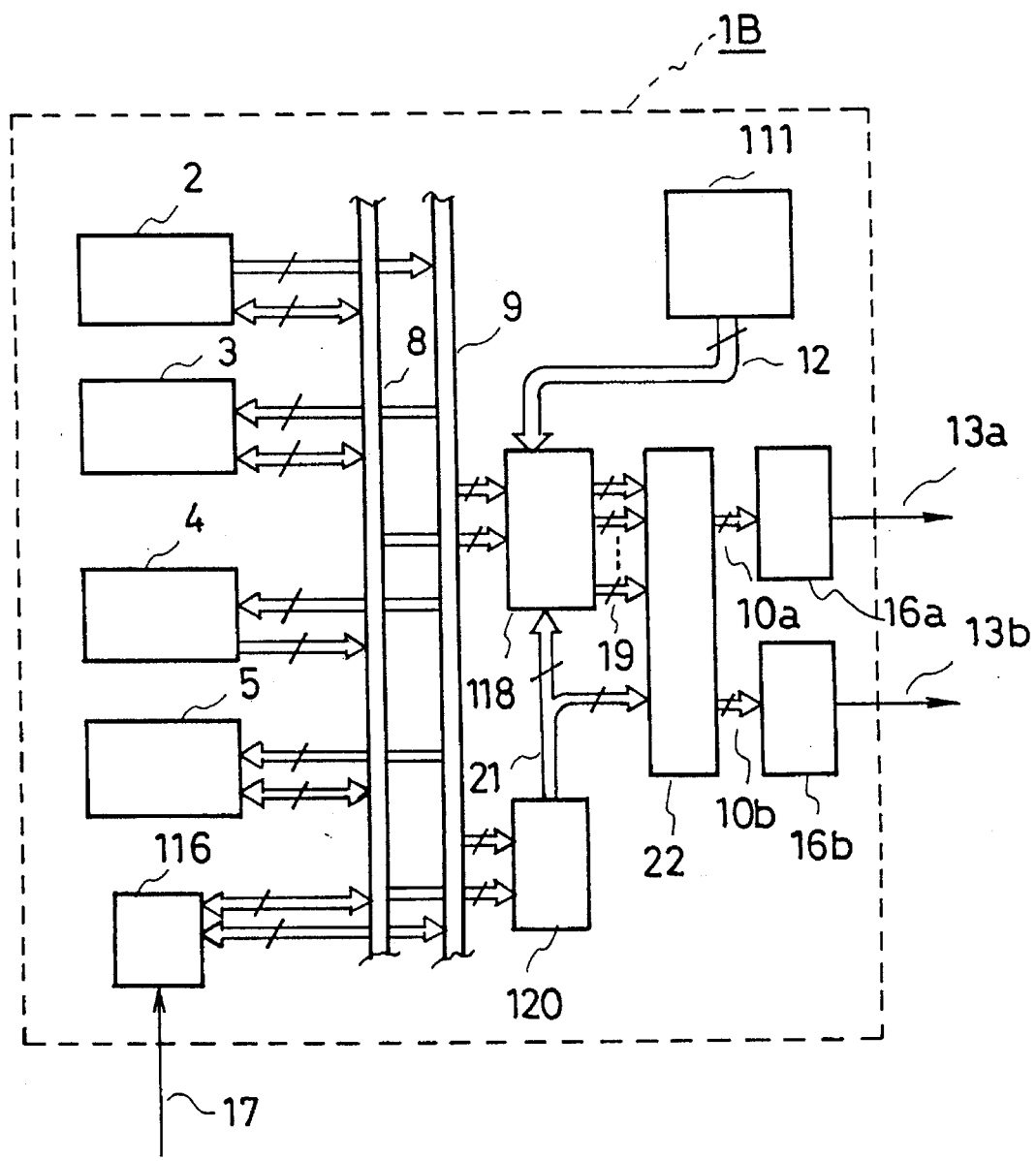
FIG. 31 is a block diagram of the internal configuration of a prior art single-chip microcomputer with built-in D/A converter.
Figure 32:
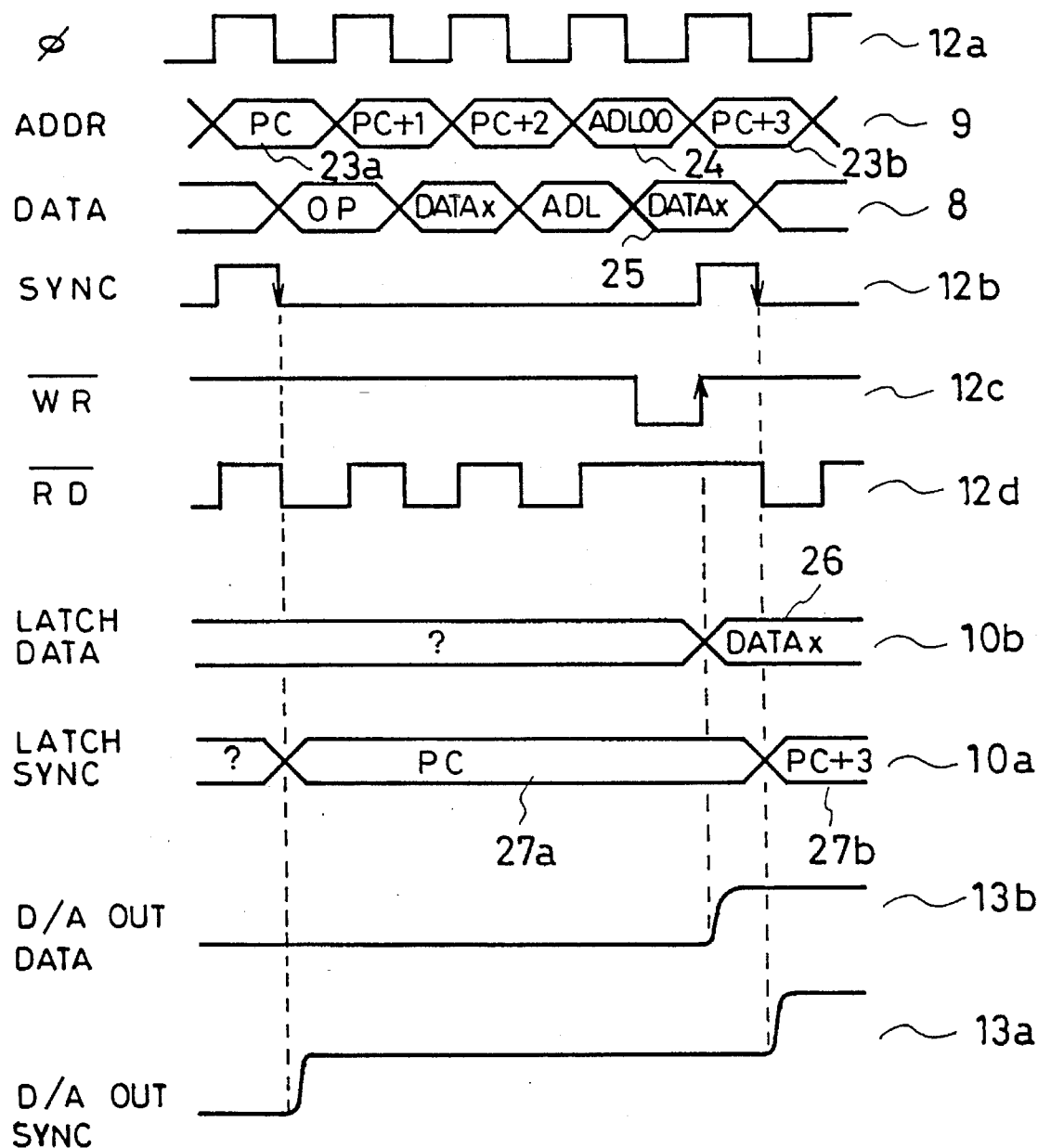
FIG. 32 is a timing chart explaining the operation of the internal state latch unit of FIG. 31.
Figure 33:
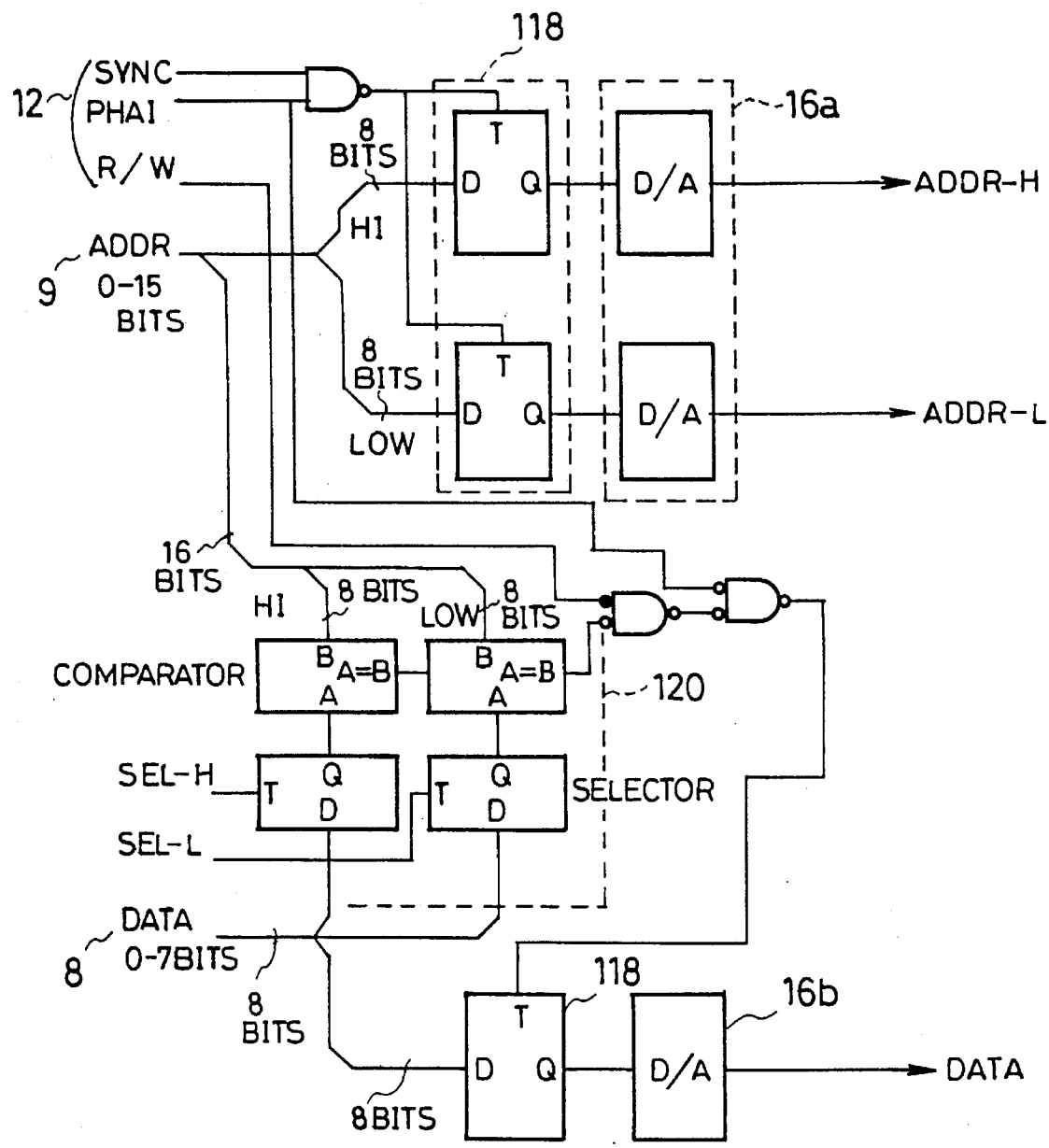
FIG. 33 is a circuit diagram of the D/A converter, internal state monitor/selector, internal state latch unit and D/A input selector of FIG. 31.
Figure 34A:
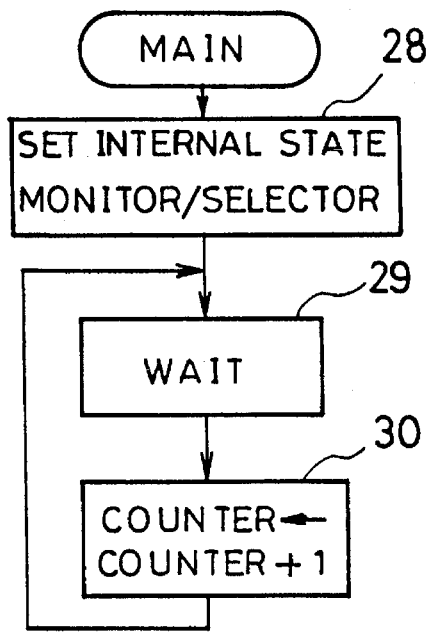
FIGS. 34(a)–34(b) are a flow chart of a sample program incorporated in the prior art microcomputer.
Figure 34B:
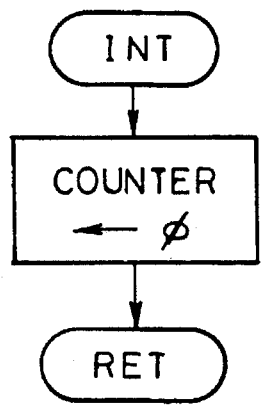
Figure 35:
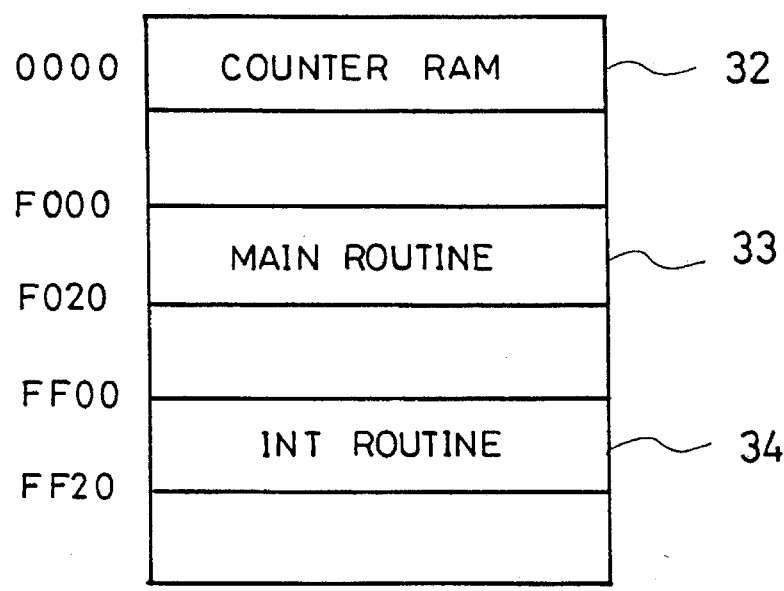
FIG. 35 is a diagram showing a memory map in the prior art.
Figure 36:
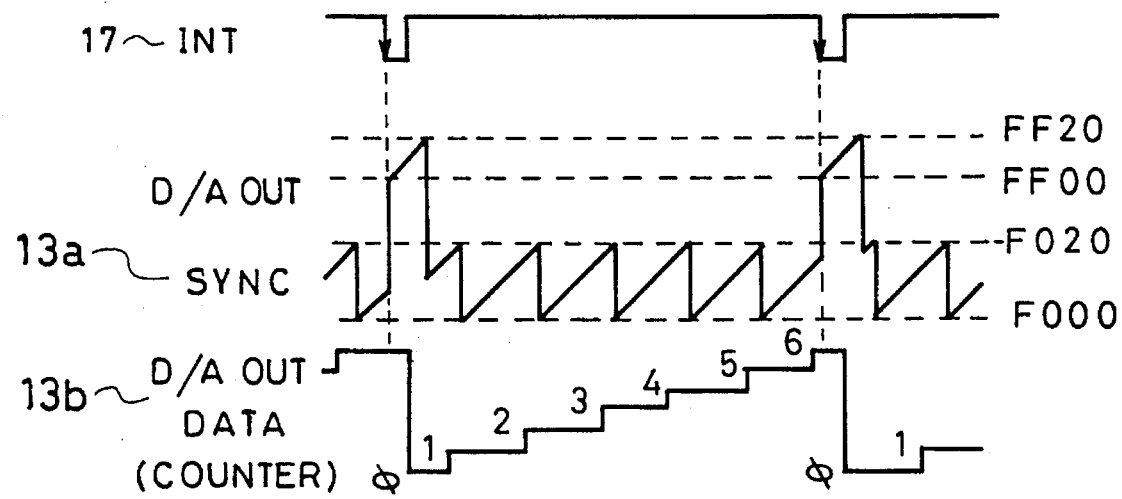
FIG. 36 is a timing chart when a program is executed in the prior art.

As a result, the application program of the microcomputer consists of the existing application program L (FIG. 28) and the debug instruction program X. Since the monitor program included in this debug instruction program X is simpler than the transfer programs i to k shown in FIG. 30, the resulting application program has a smaller volume than the application program of FIG. 30.

Since the monitor program is used for directly activating the latch contents setting register, the load of transfer processing Z on the CPU as required in the prior art is eliminated.

The above-described switch setting program is a program for setting the test switch so that RAMs to be debugged can be specified sequentially (for example, RAM (A), (B) . . . ). For instance, the program is intended for switching the screen of the TV monitor "a" from a normal mode to a test mode when the power switch, channel switch and volume switch of the TV monitor "a" are depressed at the same time, and for specifying RAMs to be monitored sequentially from RAM (A) to RAM (B) . . . each time the channel switch is depressed in the test mode.

The monitor program is for setting a storage address of a storage device storing contents to be debugged in the latch contents setting register 20.

An instruction to output contents to be debugged to the display contents latch unit by specifying a storage device and a storage address according to the debug instruction program X is called "debug instruction" and the contents instructed to be debugged are debugged later.

In short, the debug instruction program X activates the latch contents setting register so as to give a debug instruction.

Therefore, programs and data stored in a finished product can be debugged with this debug instruction program X, this additional program for instructing debugging is small in volume, and an additional load on the CPU can be eliminated.

In the above description, this additional debug instruction program X for instructing debugging is stored in the ROM, but may be stored in a storage device external to the microcomputer.

Figure 3:
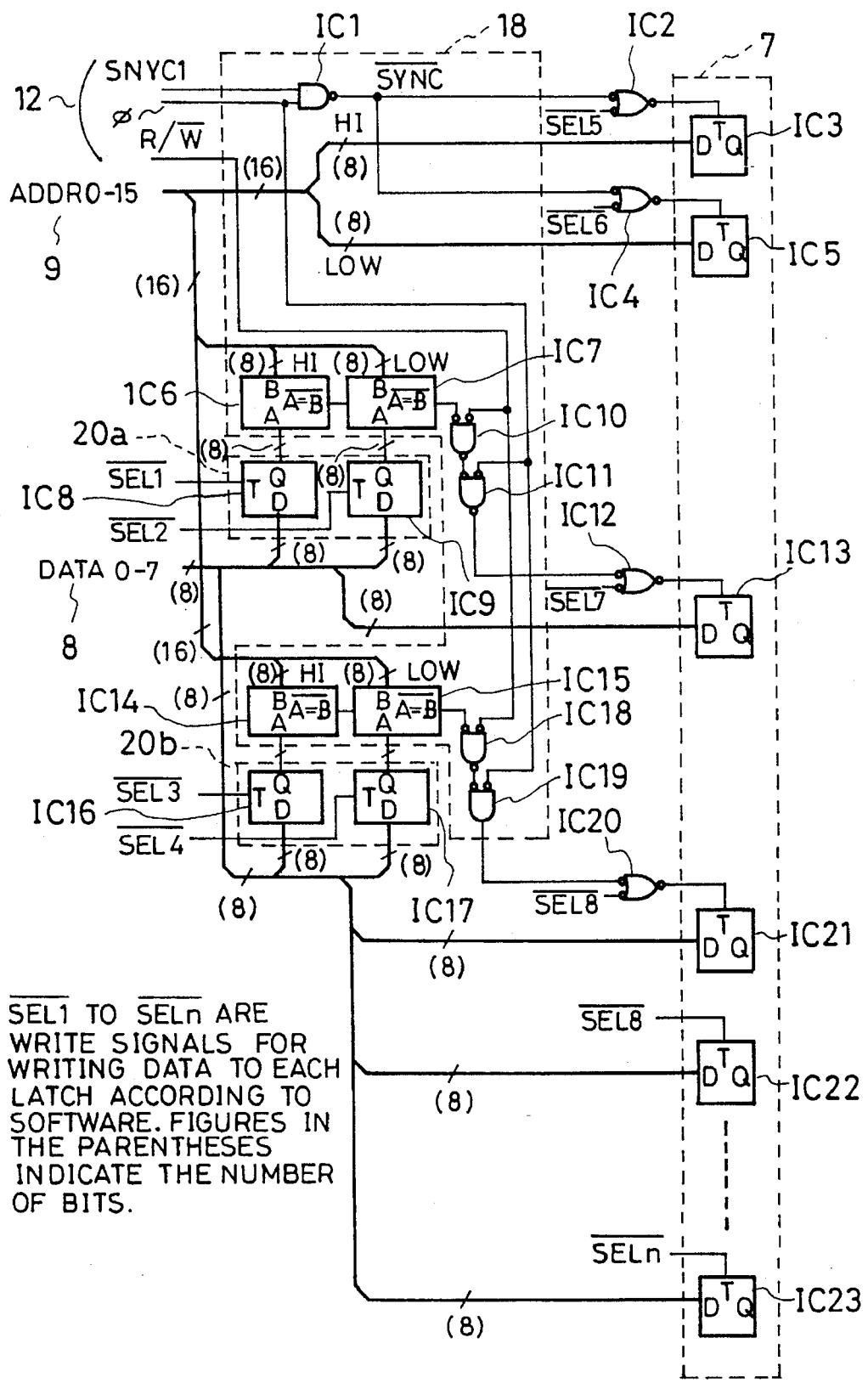
FIG. 3 is a circuit diagram of the latch contents setting register, latch timing controller and display contents latch unit of FIG. 1.

FIG. 3 shows the exemplary circuitry of the latch contents setting registers 20a and 20b, the latch timing controller 18 and the display contents latch unit 7.

A description is subsequently given of the operation of the microcomputer. The addresses of internal states to be monitored are selected by the latch contents setting registers 20a and 20b. The selected addresses are given to the latch timing controller 18 which in turn provides the display contents latch unit 7 with times when the specified internal states from among the internal states of the program counter 2, register 3, ROM 4 and RAM 5 appear on the address bus 9 and the data bus 9 according to information from the address bus 9 and the bus timing control signal 12. The display contents latch unit 7 temporarily stores the specified internal states.

Figure 4:
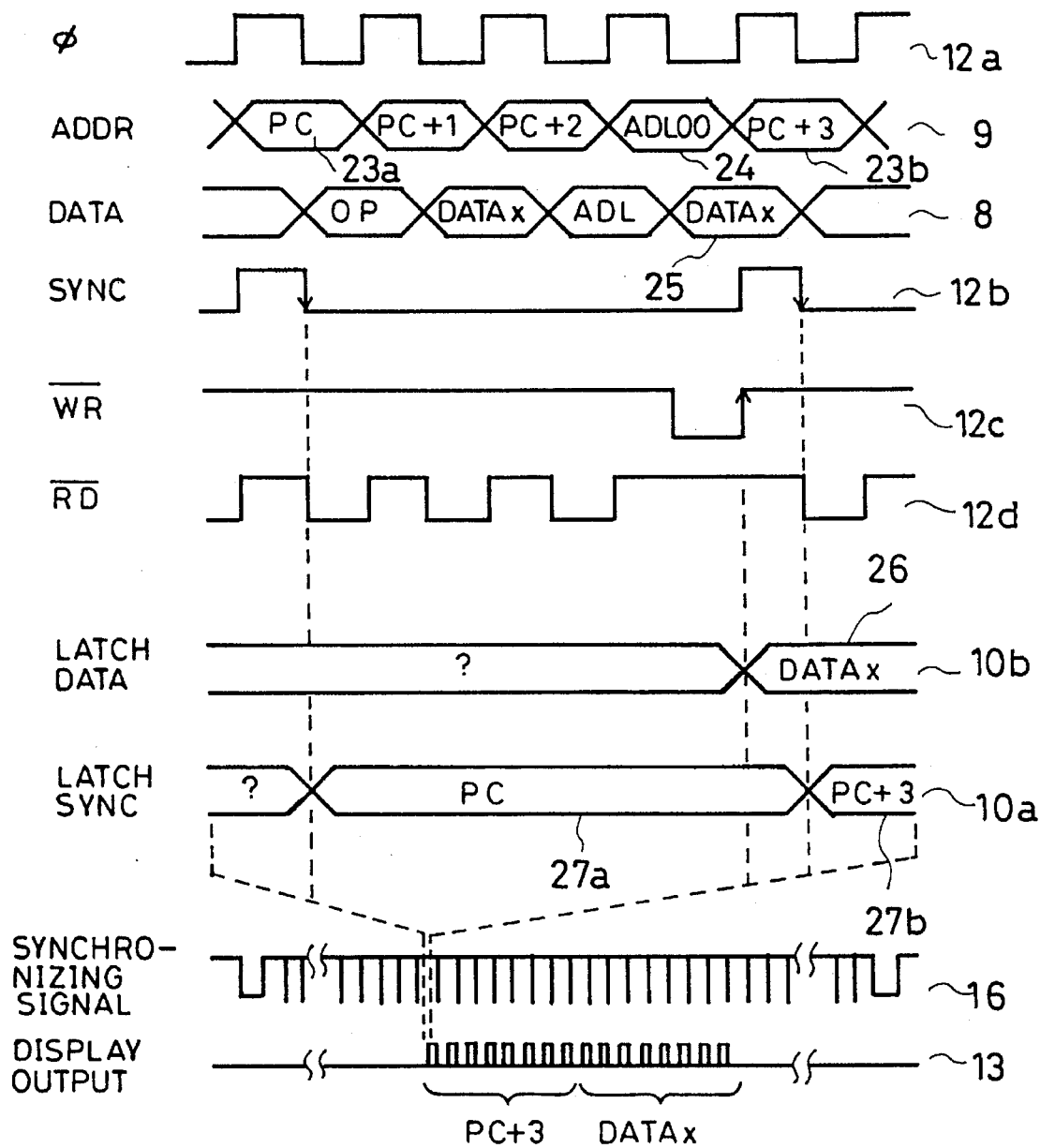
FIG. 4 is a timing chart showing the operation of the latch timing controller of FIG. 1.

A description is given of the operation of the latch timing controller 18 with reference to FIG. 4. In the figure, φ, SYNC, $\overline{WR}$ and $\overline{RD}$ are bus timing control signals 12a to 12d, respectively, ADDR is the contents of the address bus 9, and DATA is the contents of the data bus 8. In this example, the contents of the program counter 2 and the contents (to be written) of the RAM 5 at an address ADL (low-order address) are selected by the latch contents setting register 20. One (latch circuit labeled LATCH SYNC) of a plurality of latch circuits of the display contents latch unit 7 latches a value of the program counter 2 (contents 27a of (PC), contents 27b of (PC+3)) which appears on the address bus 9 upon a fall in SYNC signal, and temporarily stores and supplies the value. Upon a rise in $\overline{WR}$ signal, a latch circuit labeled LATCH DATA latches contents DATAx 26 to be written to the RAM 5 at an address ADL which appear on the data bus when a value of the address bus 9 becomes the address ADL. The display controller 6 is synchronous with the synchronizing signal 16 supplied from the outside of the microcomputer 1, converts two selected internal states (digital data) supplied from the display contents latch unit 7 into character and graphic data, and supplies the data to the outside of the microcomputer as a display output 13. Since the renewal of the data stored in the display contents latch unit 7 is inhibited during supply of the display output, the character and graphic data are not destroyed while being displayed.

"The two selected internal states" refer to the contents of the program counter (output (16 bits) of LATCH SYNC) and data to be written to the RAM at an address ADL (output (8 bits) of LATCH DATA).

A detailed description is given of the operation of the circuit shown in FIG. 3.

Figure 5:
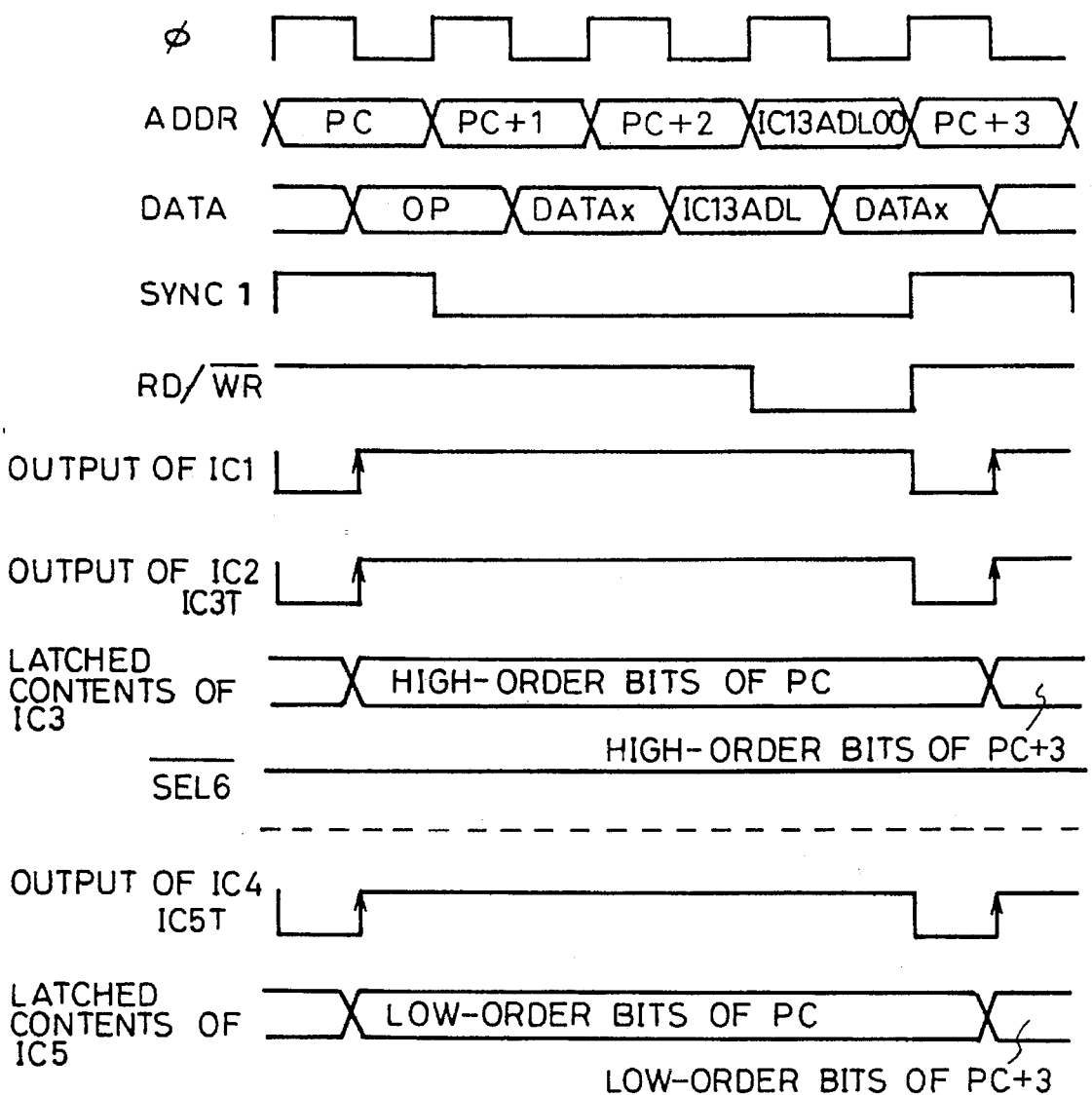
FIG. 5 is a timing chart illustrating the latch process of the instruction execution program counter according to Embodiment 1.

(1) Latch process of instruction execution program counter (chart 1) (FIG. 5)

Normally used under the condition of SEL5=SEL6="L".

IC1 (NAND) produces $\overline{SYNC}$ from φ and SYNC1. (Bar indicates that the signal is active when it is at a low level.)

A rise in $\overline{SYNC}$ indicates a leading address (PC) of an instruction being executed.

Since $\overline{SEL5}=\overline{SEL6}$="L", IC2 and IC4 (negative OR) are passed through, and high-order 8 bits of the leading address (PC) of the instruction being executed are always latched by IC3 (8-bit latch formed of a D-type flip-flop) and low-order 8 bits of the address are latched by IC5 (same type as IC3) upon a rise in SYNC.

Figure 6:
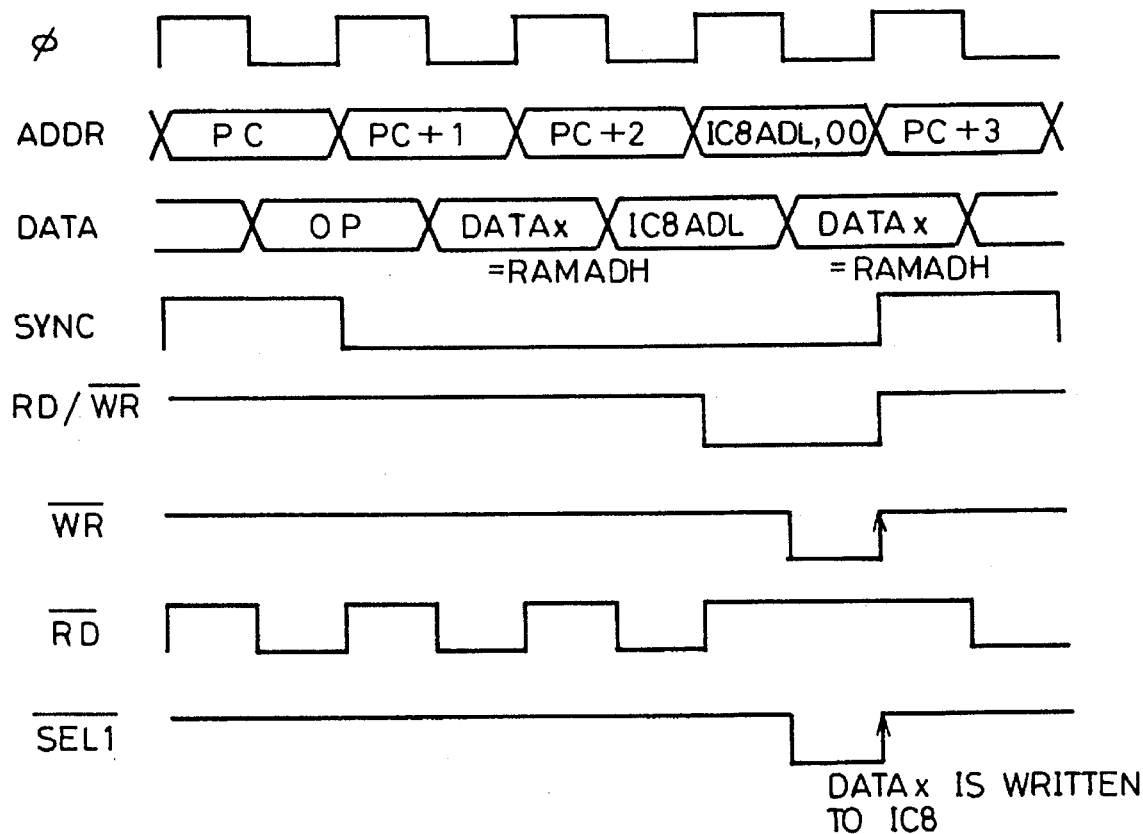
FIG. 6 is a timing chart showing the process of setting a RAM address to be monitored according to Embodiment 1.

(2) Process of setting RAM address to be monitored (chart 2) (FIG. 6)

The process of setting RAM address (RAMADH, RAMADL) to be monitored in the latch contents setting register 20a (IC8, IC9) is described below.

The following instruction of the monitor program added for debugging is executed.

LDM #RAMADH, IC8ADL

Figure 7:
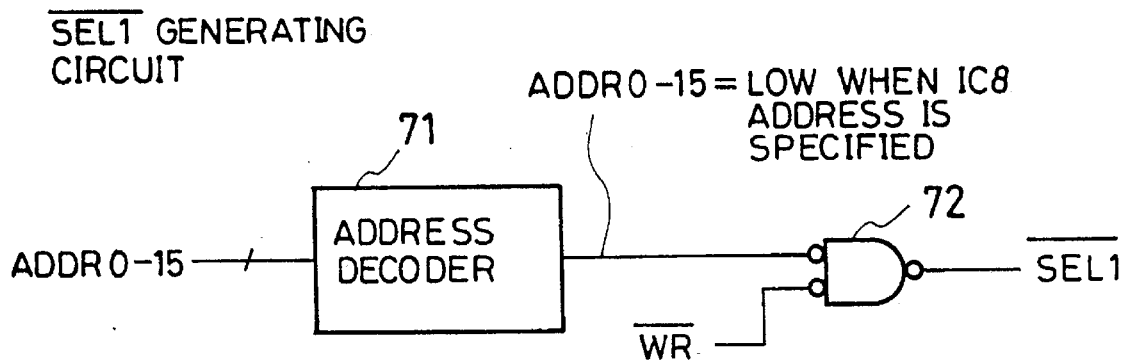
FIG. 7 is a diagram of a circuit for generating a signal $\overline{\text{SEL1}}$ of FIG. 6.

An LDM (load memory) has a function to store an immediate value of a first operand in a series of mnemonic operation codes in the RAM (or register) at the address (=low-order 8 bits, high-order 8 bits are fixed at "00") of a second operand. The code "#" of #RAMADH indicates an immediate value, and RAMADH represents high-order 8 bits of a RAM address to be monitored and set in the IC8. IC8ADL represents lower-order 8 bits of the address of ICS, and the true address (high-order 8 bits=0016) (low-order 8 bits=IC8ADL) of the IC8 is produced by the CPU and specified. The signal $\overline{SEL1}$ of FIG. 6 is produced by the address decoder 71 and the logic circuit 72 as shown in FIG. 7.

Figure 8:
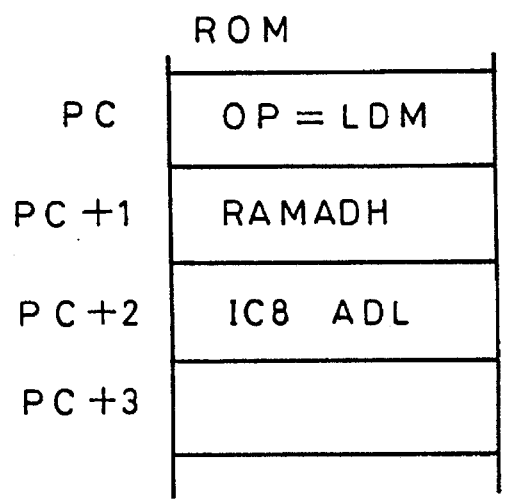
FIG. 8 is a diagram explaining a sequence to be conducted by the CPU in the chart 2 of FIG. 6.

The CPU is synchronous with the reference bus cycle clock signal φ and proceeds with the following sequence in chart 2 (see FIG. 8).

(1) PC indicates ROM and CPU reads an instruction OP code=LDM.

(2) CPU advances PC by one to read RAMADH.

(3) CPU advances PC by one to read IC8ADL.

(4) CPU adds high-order 8 bits "00" (hexadecimal) to IC8ADL to specify the address of IC8.

(5) CPU supplies RAMADH to DATA bus and generates a write time in response to RD/$\overline{WR}$ signal.

The above-described read time is specified by an $\overline{RD}$ signal produced from the reference bus cycle clock signal φ and an RD/$\overline{WR}$ signal.

The signal $\overline{SEL1}$ to be applied to the latch timing T of the IC8 becomes active when an address ADDRφ to 15 coincides with the address of the IC8 (IC8ADL, φφ) and a $\overline{WR}$ signal is generated. Therefore, according to (4) and (5) described above, a value of RAMADH on the data bus is latched by the IC8 latch.

By the same process as described above, low-order 8 bits of a RAM address to be monitored are set in the IC9 according to an instruction LDM #RAMADL, IC9ADL.

Figure 9:
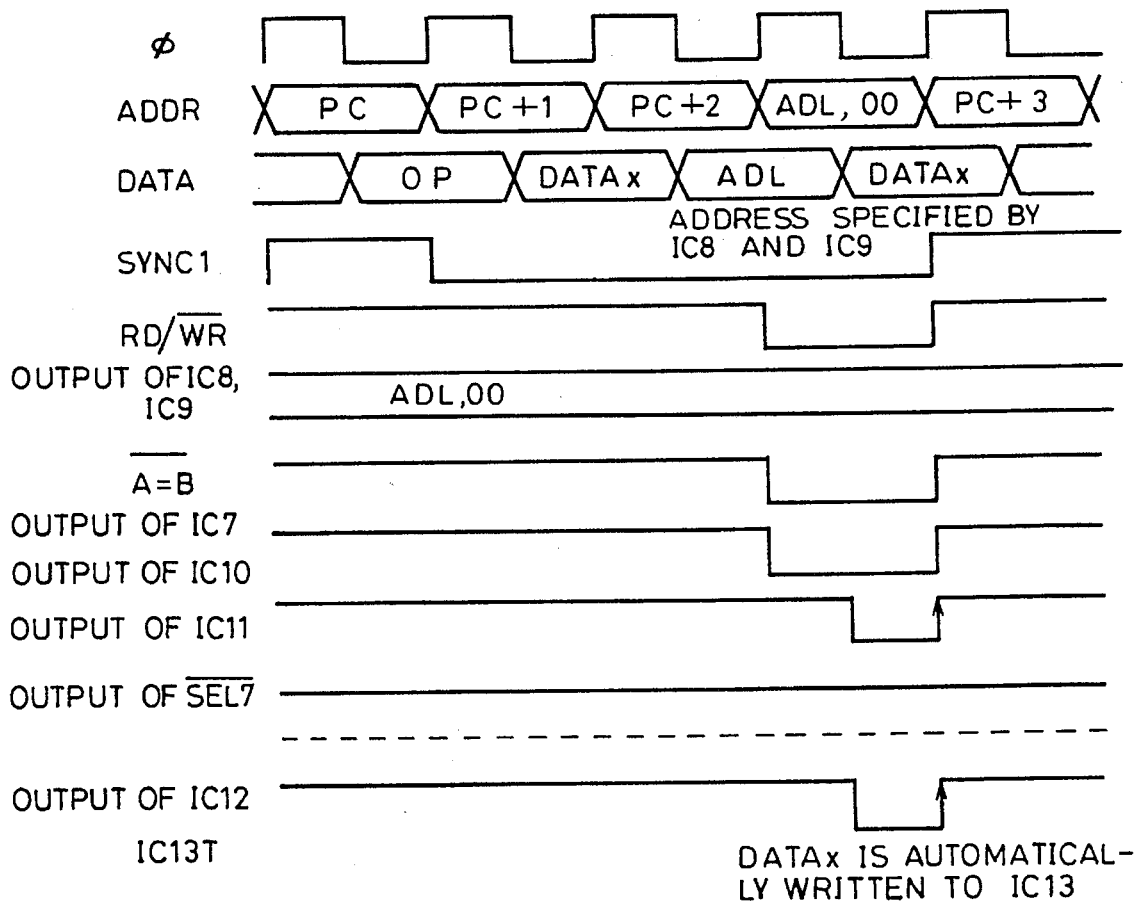
FIG. 9 is a timing chart showing the process in which RAM contents to be monitored are automatically latched by the display contents latch unit according to Embodiment 1.

(3) Process of causing RAM contents being monitored to be automatically latched by the display contents latch unit (chart 3) (FIG. 9)

The process in which the contents of the RAM at the address set in the IC8 and IC9 are latched by the IC13 is described below.

The digital comparators of the IC6 and IC7 always check coincidence between the contents of the IC8 and IC9 and data on the address bus.

If they coincide, "L" is generated from $\overline{A=B}$.

IC10 (negative AND) generates "L" when $\overline{A=B}$ output= "L" and RD/$\overline{WR}$="L", and detects that data is written to a specified address.

IC11 (negative AND) is used to shape the output of the IC10 with the clock signal φ.

Since SEL7 is normally at "H", the output of IC11 is directly supplied to the input of IC13T.

Therefore, when data is written at the address set in IC8 and IC9, the input of IC13T rises and the contents (same as contents written to RAM (register)) of the DATA bus at this time are latched by IC13.

The digital comparators IC6 and IC7 (14, 15) within the latch timing controller 18 function as comparison means for comparing an address in a storage device supplied from the IC8 and IC9 (16, 17) constituting the latch contents setting register 20 with an address appearing on the address bus and for generating a latch timing signal to the IC13 (21, 22, 23) constituting the display contents latch unit 7.

In the case described above, the $\overline{SEL}$ signal functions as a write signal set by the monitor program and is applied to one input terminals of IC2, IC4 and IC12 as latch control means. The write signal applied to the IC2 and IC4 are set at "L" by the instruction of the monitor address setting program so that the contents of the program counter are latched by the IC3 and IC5 in response to $\overline{\text{SYNC}}$ as a latch trigger signal. The write signal applied to the IC 12 as the latch control means is set at "H" by the monitor program so that the contents of the RAM are latched by the IC13 in response to the output of the IC11 as a latch trigger signal.

Figure 10:
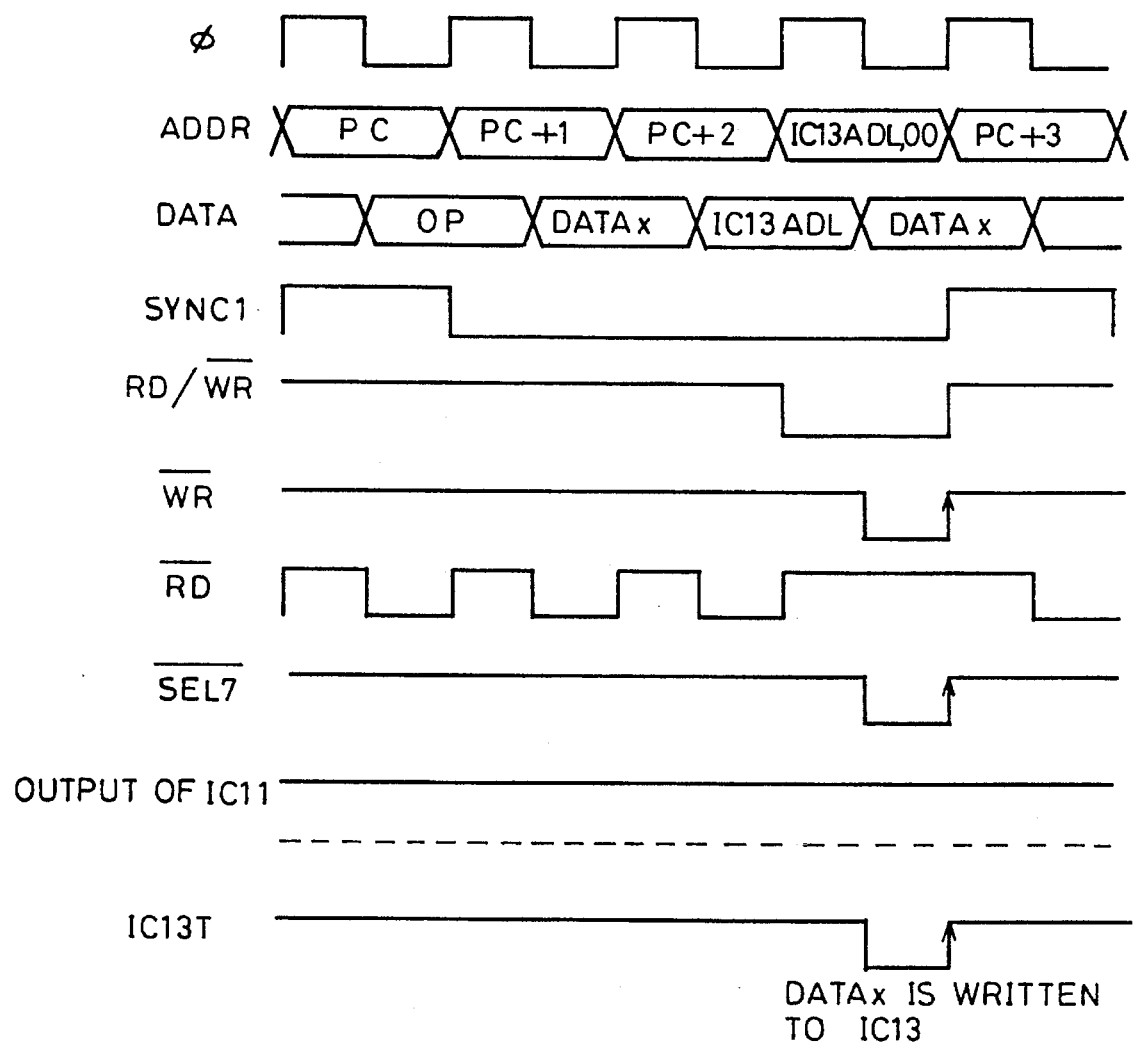
FIG. 10 is a timing chart showing the process of writing data directly to the display contents latch unit according to Embodiment 1.
Figure 11:
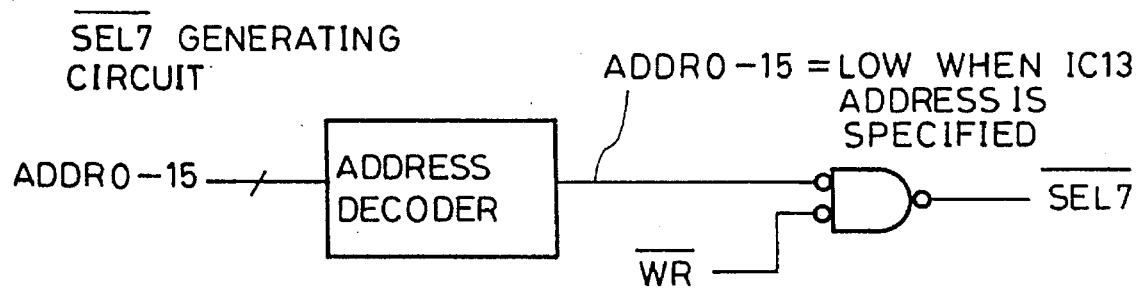
FIG. 11 is a diagram of a circuit for generating a signal $\overline{\text{SEL7}}$ of FIG. 10.

(4) Process of writing data directly to display contents latch unit (chart 4) (FIG. 10)

when the display contents latch unit is used by the application program (that is, the contents of the application program are debugged), it is necessary to write data directly to the latch circuits according to an instruction.

In the example of FIG. 3, data cannot be written directly to IC3 and IC5 among latch circuits IC3, IC5, IC13, IC21, IC22 and IC23, and IC3 and IC5 cannot be used by the application program.

The process of writing data to IC13 according to an instruction is described below.

The following instruction of the application program is executed.

LDM #OSDDATA, IC13ADL

This changes SEL7 of IC12 from "L" to "H" and OSD-DATA (8 bits) appearing on DATA bus is latched by IC13.

A non-existent address (ROM address, etc.) is latched by IC8 and IC9 in advance to prevent the other input of IC 12 (negative OR) from becoming "L" at this time.

In this case, the write signal ($\overline{\text{SEL7}}$) applied to the IC12 as the latch control means is set so as to change from "L" to "H" according to an instruction included in the application program. The output of the IC11 is set at "H".

Therefore, a latch trigger signal is generated by a change in the state of the write signal ($\overline{\text{SEL7}}$) to enable the IC13 to directly latch the contents of the RAM.

In other words, the debug instruction program for debugging the contents of an application program is an application program including a switch setting program and an instruction for directly writing the contents of the program directly to the display contents latch unit.

The method for setting a ROM address to which data cannot be written in the IC8 is to provide a dedicated program for this purpose or a separate hardware circuit for enabling the IC8 to generate the ROM address according to an instruction.

The IC12 (latch control means) functions as means for using the display contents latch unit for different purposes according to the latch timing signal and SEL signal: to write the contents of the program counter or a storage device according to the monitor program, and to directly write the contents of an application program according to the application program.

Figure 13A:
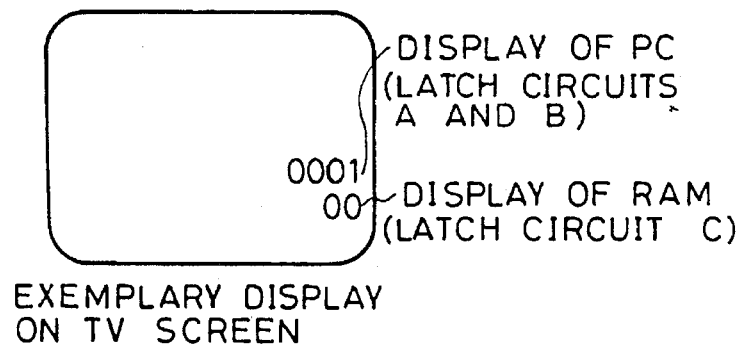
FIGS. 13(a)–13(c) are a diagram illustrating the operation of the display controller.
Figure 13B:
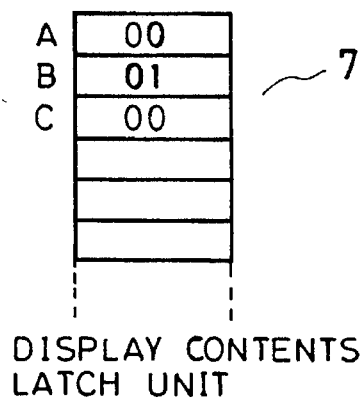
Figure 13C:
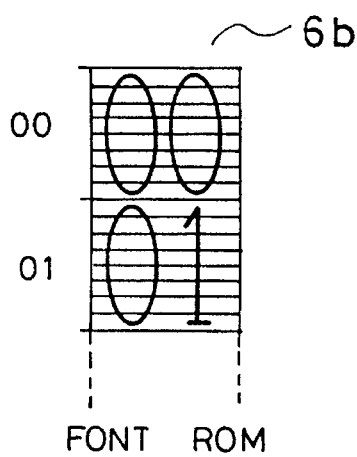
Figure 14:
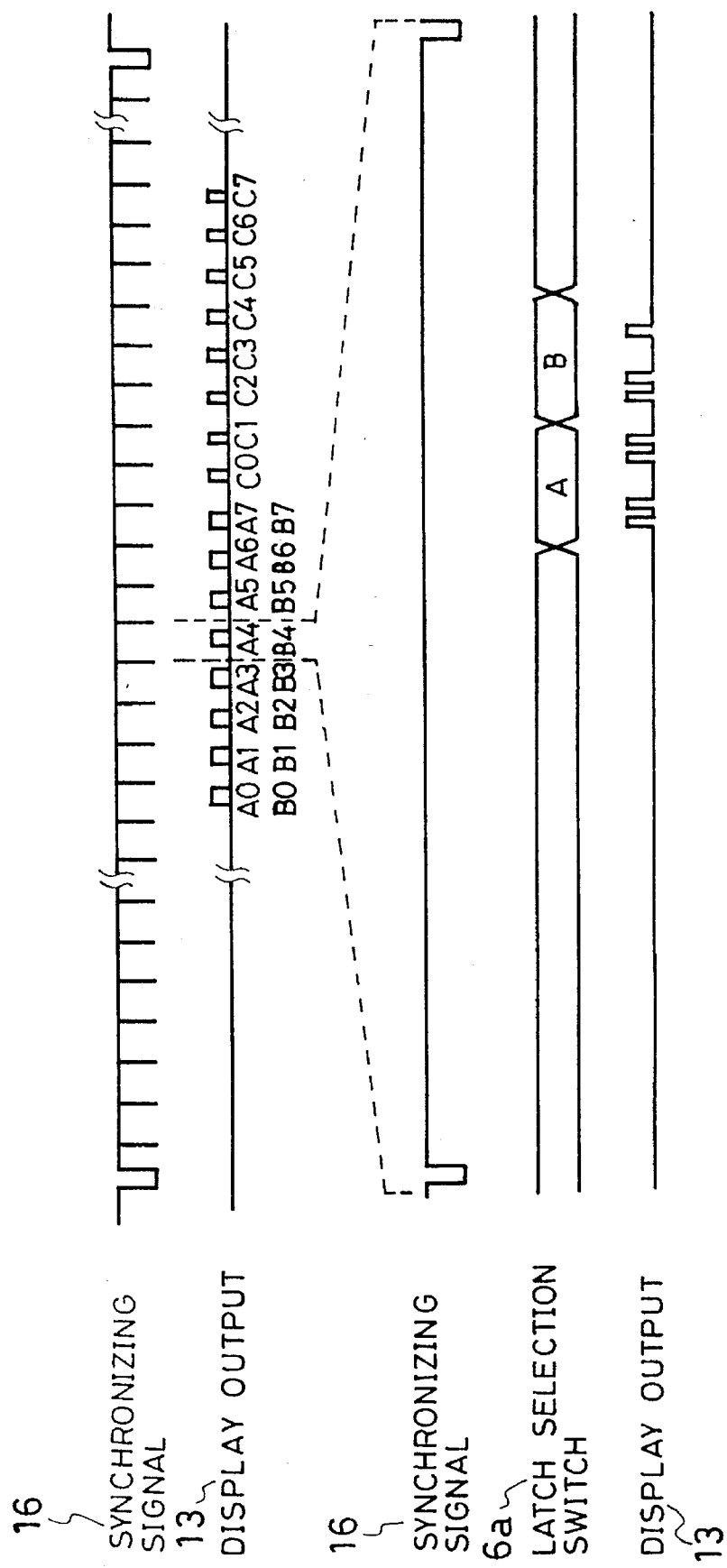
FIG. 14 is a timing chart explaining the operation of the display controller.

The detailed configuration of the display controller 6 is shown in FIG. 12 and its operation is described with reference to FIGS. 13 and 14.

In FIG. 12, denoted at 6a is a latch selection switch for selecting one (8 bits) of the latch circuits such as LATCH SYNC and LATCH DATA included in the display contents latch unit 7, 6b a font ROM for generating parallel data according to the output signal (8 bits) of the selected latch circuit, 6c a parallel/serial converter for converting the parallel data into serial data and supplying the serial data as a display output 13, and 6d a screen display timing controller synchronous with a TV screen synchronizing signal 16 supplied from the outside of the microcomputer, for controlling the latch selection switch 6a, the font ROM 6b and the parallel/serial converter 6c.

A description is subsequently given of the operation of the display controller 6. FIG. 13(a) shows an example of display on a TV screen in which the state of the program counter (latch circuits A and B labeled LATCH SYNC) is displayed with a four-digit numerical character and the state of the RAM (latch circuit C labeled LATCH DATA) with a two-digit numerical character on different lines of the TV screen. FIG. 13(b) shows the contents of the display contents latch unit 7 wherein digital data, "00" (hexadecimal), "01" (hexadecimal) and "00" (hexadecimal), are latched by the latch circuits A, B and C, respectively, according to the latch contents setting register 20 and the latch timing-controller 18 through the process described in the foregoing. FIG. 13(c) shows the contents of the font ROM 6b which has a capacity of 2K bytes (256 fonts) because each of the two-digit numerical characters is represented by one font (8×8 dots, i.e., one font=8 bytes). The font ROM 6b receives an 11-bit address consisting of high-order 8 bits from the output signal of the latch selection switch 6a and low-order 3 bits from the output signal of the screen display timing controller 6d and supplies an 8-bit output signal to the parallel/serial converter 6c.

A description is subsequently given of the operation timing of the afore-mentioned display controller 6 with reference to FIG. 14.

The screen display timing controller 6d is set by a microcomputer program to display the contents of the latch circuits A, B and C at positions of the TV screen shown in FIG. 13(a). The screen display timing controller 6d counts the synchronizing signal 16 and a display clock signal having a phase locked by the synchronizing signal 16 generated within the screen display timing controller 6d, and waits for a time to start display with a TV scanning line and at a display position in a horizontal direction. When this time comes, the latch circuit A within the display contents latch unit 7 is selected by the latch selection switch 6a, the low-order three bits of the address of the font ROM 6b are set at "000" (binary), and the first line data of a font is read from the font ROM 6b. This first line data is written to the parallel/serial converter 6c which supplies the converted serial data as the display output 13 in response to the above-described display clock signal. Subsequently, the latch selection switch 6a is switched to the latch circuit B to supply the first line data in the same manner as described above to complete the output processing of data scanned by a single scanning line for display on the TV screen. For the subsequent scanning line, the low-order three bits of the address of the font ROM 6b are set at "001" (binary), and the second line data in the font ROM 6b specified by the latch circuits A and B are read and converted in serial data which is supplied as the display output 13. The contents of the latch circuits A and B are displayed using 8 scanning lines in the same manner as described above. Thereafter, the contents of the latch circuit C are also displayed using 8 scanning lines in the same manner as described above.

In the above-described Embodiment 1, once an address to be monitored is specified by software, the additional latch timing controller and the display contents latch unit automatically supply the contents to the outside continuously, thereby minimizing an increase in the number of programs. In the configuration of Embodiment 1, since the contents of the display contents latch unit can be controlled directly by software as in the prior art, the microcomputer can be used as a single-chip microcomputer with built-in OSD for displaying application information on the TV screen even when the internal states of the microcomputer need not to be monitored from outside.

To sum up Embodiment 1, the microcomputer (claim 1) wherein the contents of a program counter and a storage device such as a RAM, ROM and register are set in the latch contents setting register by software, written to the display contents latch unit, and converted into character and graphic data by the display controller is provided with a debug instruction program X including a monitor program and a switch setting program, for instructing debugging.

Furthermore, an application program including an instruction for writing the contents of an application program directly to the display contents latch unit is used to instruct debugging.

Moreover, the IC12 (latch control means) is activated based on the latch timing signal and the $\overline{SEL}$ signal to use the display contents latch unit for different purposes: to write the contents of a storage device and a program counter by means of the monitor program and to directly write the contents of an application program by means of the application program.

Embodiment 2 (claims 7 and 8)

Figure 15:
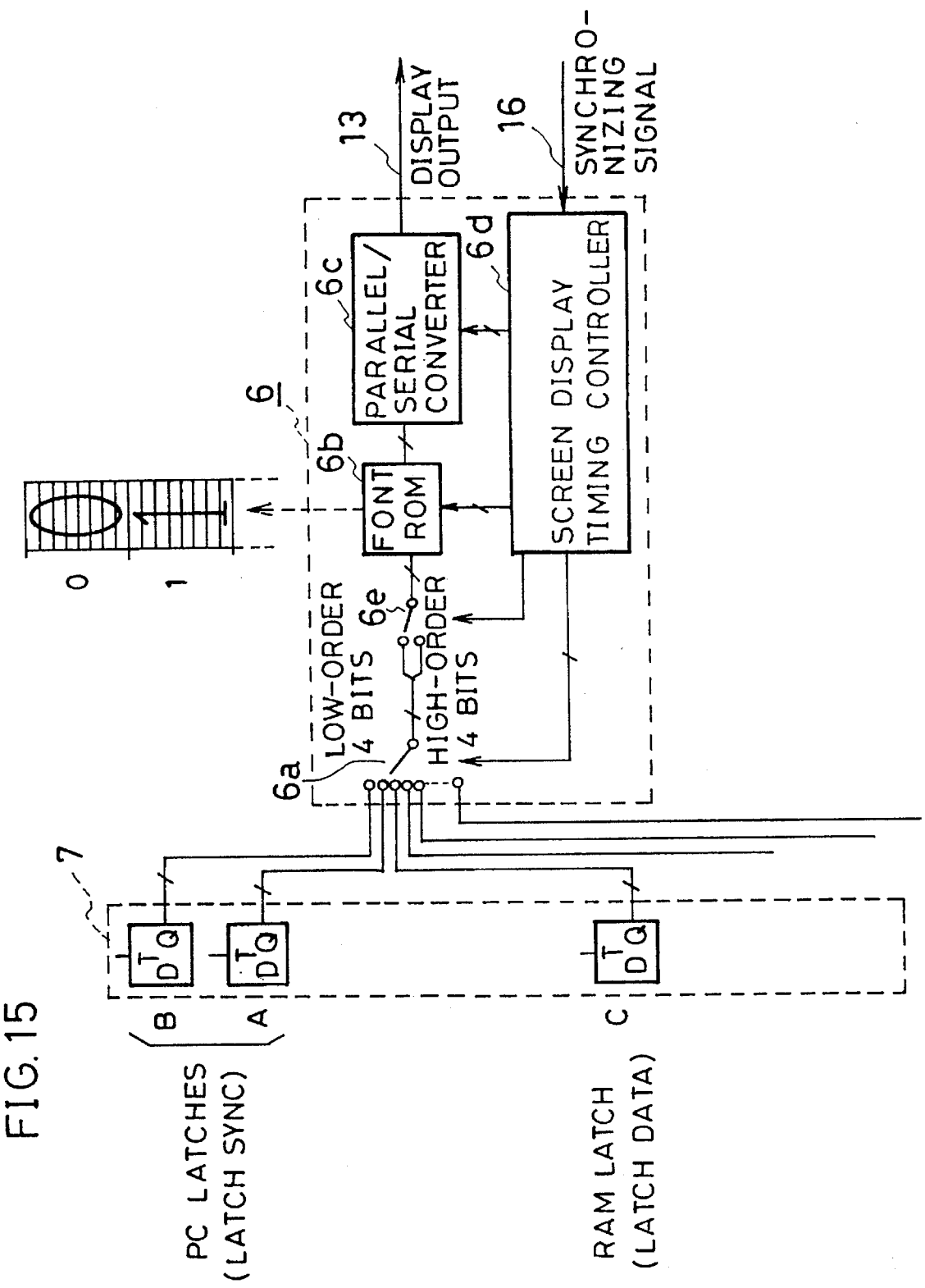
FIG. 15 is a block diagram of the configuration of the display controller according to Embodiment 2 of the invention.
Figure 16:
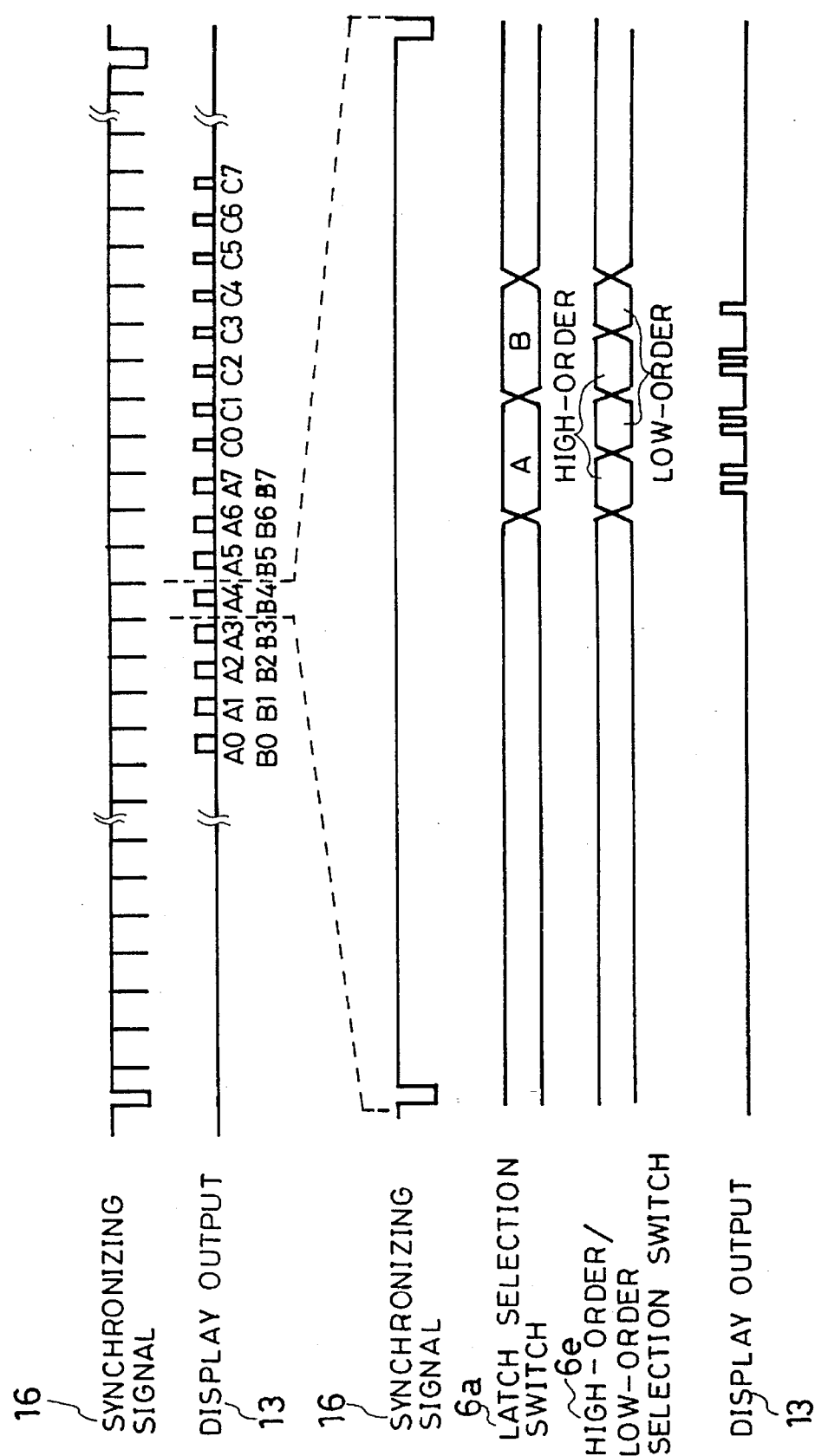
FIG. 16 is a timing chart explaining the operation of the display controller.

Embodiment 2 of the invention is described hereinunder. FIG. 15 is a block diagram of the configuration of the display controller 6 of this Embodiment 2, and FIG. 16 is a timing chart showing the operation timing of the display controller 6. In the above-described Embodiment 1, each latch circuit within the display contents latch unit has an 8-bit output signal, and a font ROM having 256 fonts is required for displaying a two-digit hexadecimal number on a display device. In this Embodiment 2, a high-order/low-order selection switch 6e for selecting high-order or low-order 4 bits from the 8-bit output of the latch selection switch 6a is connected to an input of the font ROM 6b in the display controller 6. Therefore, an address received by the font ROM 6b is 7 bits which consists of low-order 3 bits indicative of a line number renewed for each scanning line and supplied from the screen display timing controller 6d and high-order 4 bits as the output signal of the high-order/low-order selection switch 6e. Consequently, the capacity of the font ROM 6b is sufficient at 128 bytes (16 characters×8 bytes), 1/6 that of the above-described Embodiment 1, thereby reducing the costs of the microcomputer.

A description is subsequently given of the operation of this Embodiment 2, taking the display of the program counter (latch circuits A and B) as an example. The screen display timing controller 6d first selects the latch circuit A by means of the latch selection switch 6a and high-order 4 bits by means of the the high-order/low-order selection switch 6e at the same time. Thereby, an address corresponding to the first digit font of the two-digit hexadecimal number which is the contents of the latch circuit A is supplied to the circuit A, and the first digit and the last digit stored in the latch circuit B are selected sequentially to complete the display of data scanned by a single scanning line. The display of the program counter (latch circuits A and B) is completed by displaying data scanned by a total of eight scanning lines.

Embodiment 3 (claim 6)

Figure 17:
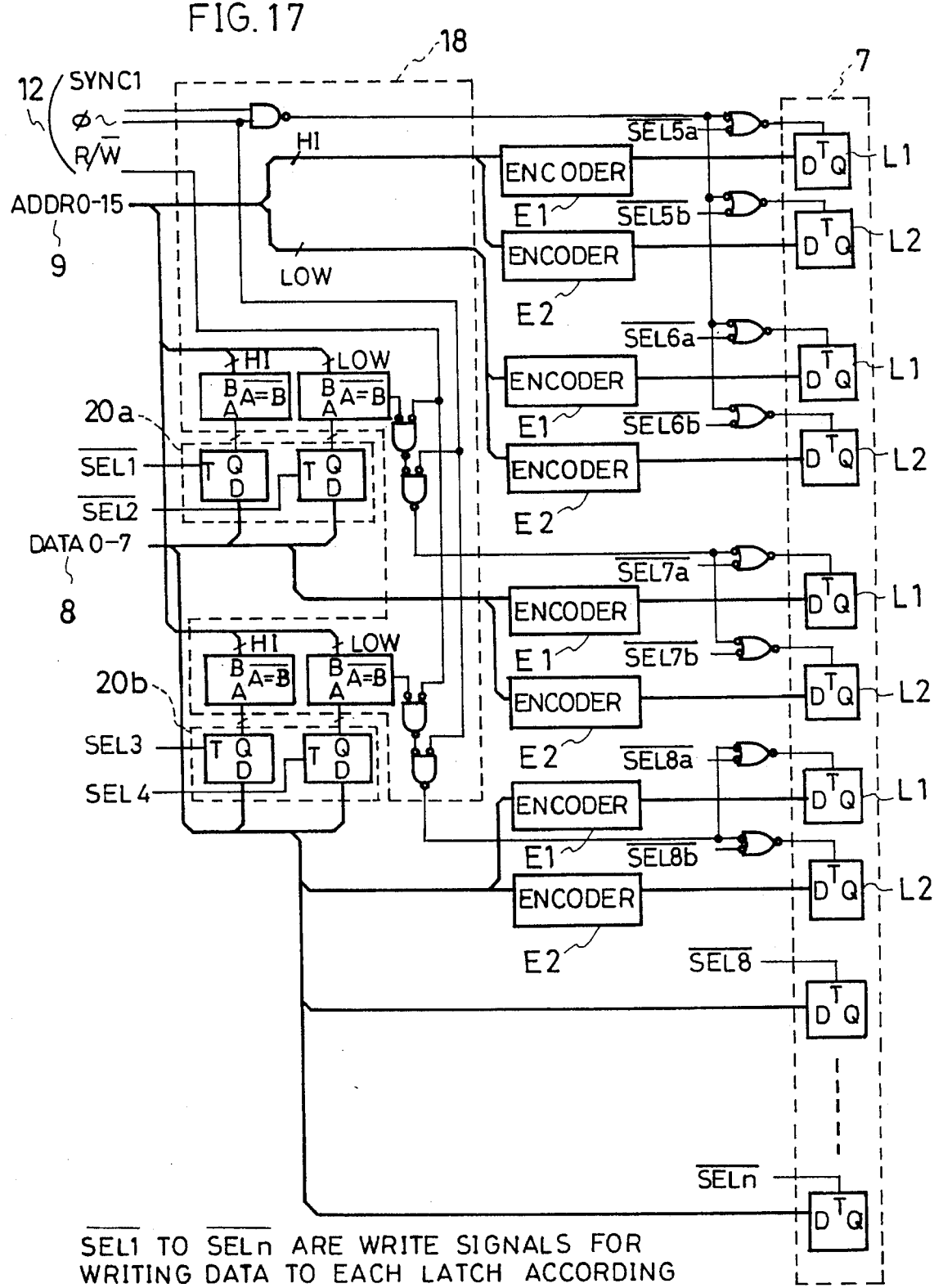
FIG. 17 is a circuit diagram of the encoders and their peripherals according to Embodiment 3 of the invention.
Figure 18A:
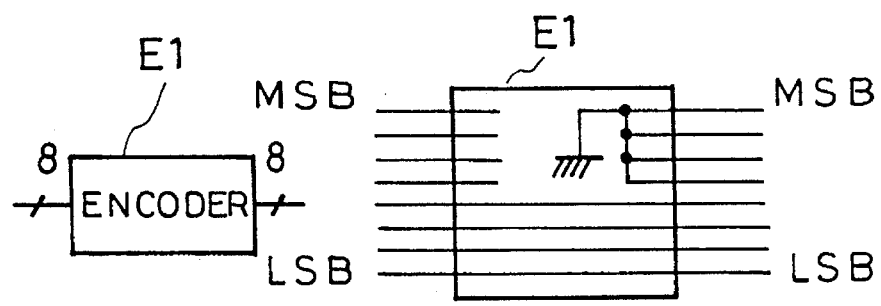
FIGS. 18(a)–18(b) are a circuit diagram of inputs and outputs of the encoders of FIG. 17.
Figure 18B:
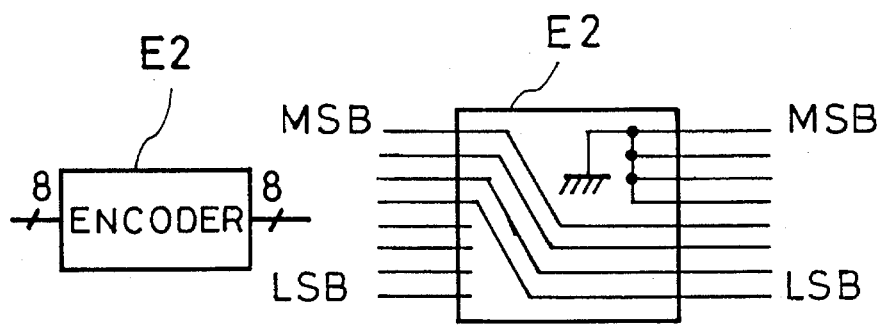

Embodiment 3 of the invention is described hereinunder. FIG. 17 is a circuit diagram of encoders and their peripherals which feature this Embodiment 3. FIGS. 18(a) and (b) are circuit diagrams of inputs and outputs of the encoders of FIG. 17. In the above-described Embodiment 1, each latch circuit of the display contents latch unit has an 8-bit output and the font ROM having 257 different fonts is required to display a two-digit hexadecimal number on a display device. In this Embodiment 3, encoders E1 (FIG. 18(a)) and E2 (FIG. 18(b)) are connected to the 8-bit latch circuits of the display contents latch unit 7 to convert high-order 8 bits and low-order 8 bits of the address bus and 8 bits of the data bus, and the number of latch circuits of the display contents latch unit of Embodiment 1 is doubled so as to reduce the number of fonts stored in the font ROM to 16, 1/16 that of the font ROM of Embodiment 1.

A description is subsequently given of the operation of this Embodiment 3. Although high-order 8 bits of the address bus is connected to one 8-bit latch in the above-described Embodiment 1, it is connected to two 8-bit latch circuits L1 and L2 through the encoders E1 and E2. The encoder E1 fixes high-order 4 bits of the high-order 8 bits of the address bus at "0", and supplies low-order 4 bits directly. On the other hand, the encoder E2 supplies high-order 4 bits of the high-order 8 bits of the address bus directly as the low-order 4 bits of the output thereof and supplies "0" as the high-order 4 bits of the output thereof. Therefore, the latch circuits L1 and L2 latch the last digit and the first digit of the two-digit hexadecimal number obtained from the high-order 8 bits of the address bus, respectively. Similar encoders E1 and E2 are provided for other latch circuits L1 and L2 corresponding to the low-order 8 bits of the address bus and 8 bits of the data bus. Since the latch circuits L1 and L2 take values of 0–15 due to the construction described above, it is sufficient for the font ROM to have 0 to 15 (0 to F in hexadecimal notation) fonts, whereby the volume of the font ROM can be reduced with the result of reduced costs of the microcomputer.

Embodiment 4 (claims 9 and 10)

Figure 19:
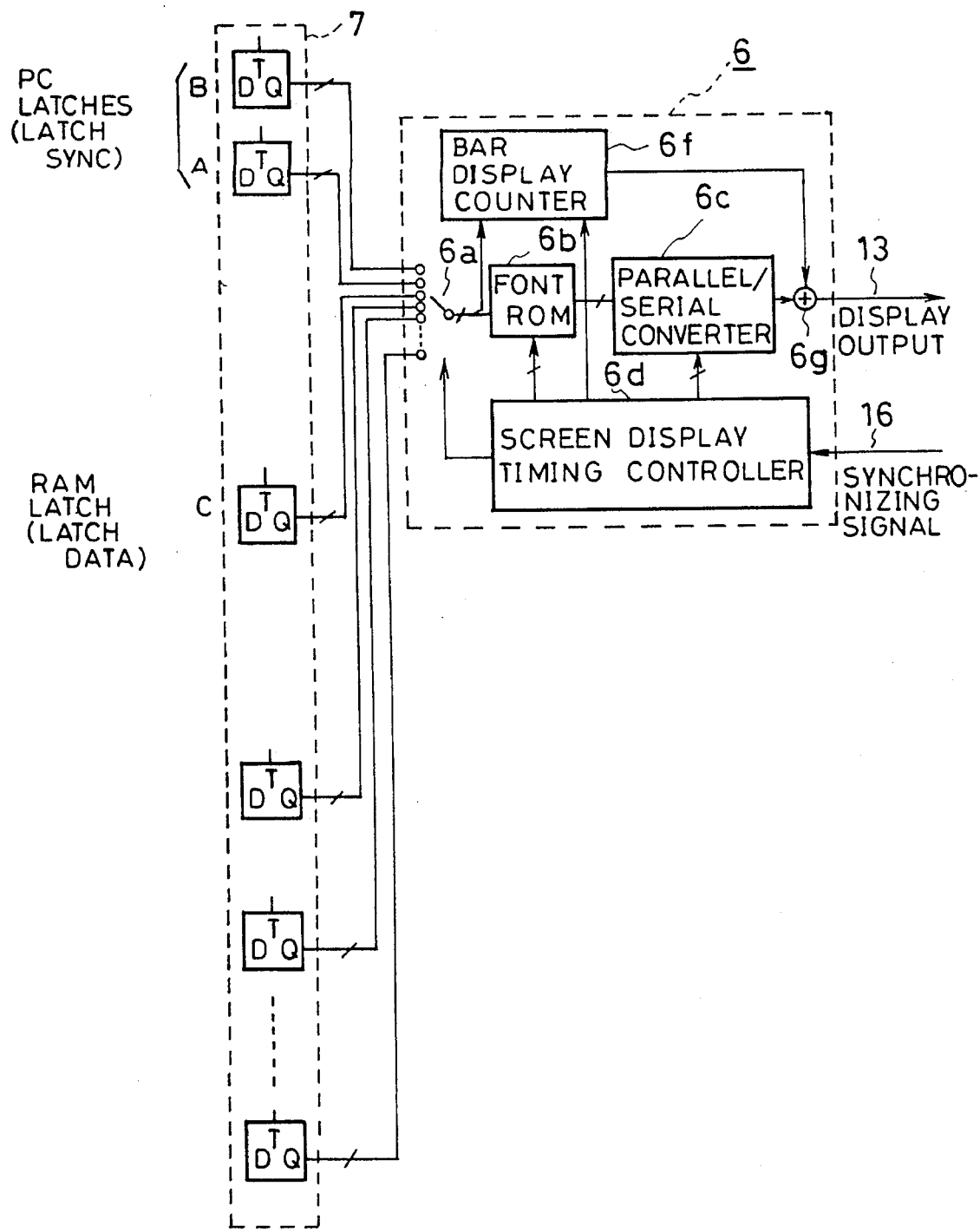
FIG. 19 is a block diagram of the configuration of the display controller according to Embodiment 4 of the invention.

FIG. 19 is a block diagram of the display controller 6 and the display contents latch unit 7 according to Embodiment 4 of the present invention. The microcomputer of this Embodiment 4 includes a bar display counter 6f for receiving the output signal of the latch selection switch 6a and supplying a display output 13 and an OR gate 6g for ORing the output signal of the parallel/serial converter 6c and the output signal of the bar display counter 6f in addition to the constituent elements of the above-described Embodiment 1.

In this Embodiment 4, the contents of each latch circuit are displayed graphically for easy understanding and analog recognition is made possible to cope in the case where data to be monitored (numerals, for example) changes quickly.

Figure 20:
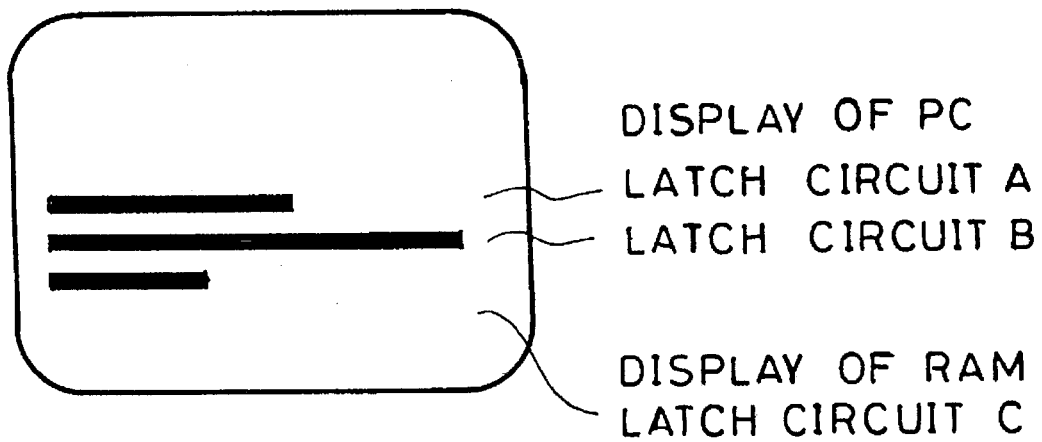
FIG. 20 is a diagram of exemplary display on a TV screen according to Embodiment 4.
Figure 21:
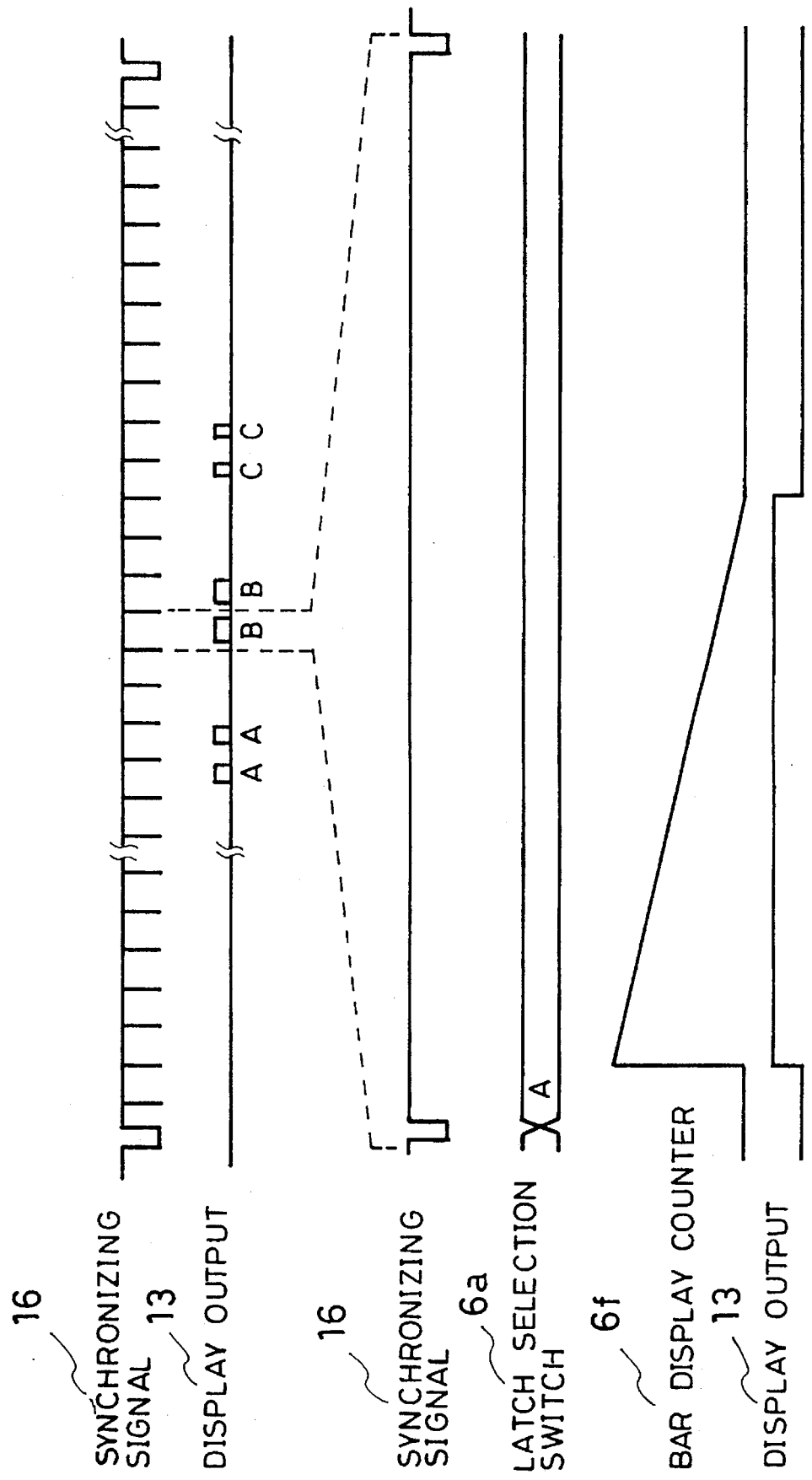
FIG. 21 is a timing chart explaining the operation of the display controller.

FIG. 20 shows an example of display on a TV screen. As shown in FIG. 20, 8-bit digital data of the latch circuits A, B and C are displayed as a horizontal bar graph on the screen. FIG. 21 is a timing chart showing this operation. The screen display timing controller 6d of FIG. 19 counts the synchronizing signal 16 and a display clock signal having a phase locked by the synchronizing signal 16 and waits for a time to start display with a scanning line at a position in a horizontal direction. The time is set by the program of the microcomputer in advance. When the time comes, the latch circuit A of the display contents latch unit 7 is selected by the latch selection switch 6a and the contents of the latch circuit A are stored in the bar display counter 6f. The bar display counter 6f generates a level "H" as the display output 13 from the moment the contents are stored, counts down the display clock signal, and generates a level "H" as the display output 13 at the moment when an underflow occurs. After the same operation is repeated for four scanning lines, display is not performed (output "L") for the subsequent four scanning lines so as to provide spacing between bars. Thereafter, the latch circuit B is selected by the latch selection switch 6a, data scanned by four scanning lines are displayed and data scanned by the subsequent four scanning lines are not displayed to provide spacing between bars, and finally the same operation is made on the latch circuit C.

Since the display output 13 is the OR of the output signal of the bar display counter 6f and the output signal of the parallel/serial converter 6c, the same operation as in Embodiment 1 can be performed and it is also possible to display alphanumerics and a graph at the same time if necessary.

Embodiment 5 (claims 1 to 5)

Figure 22:
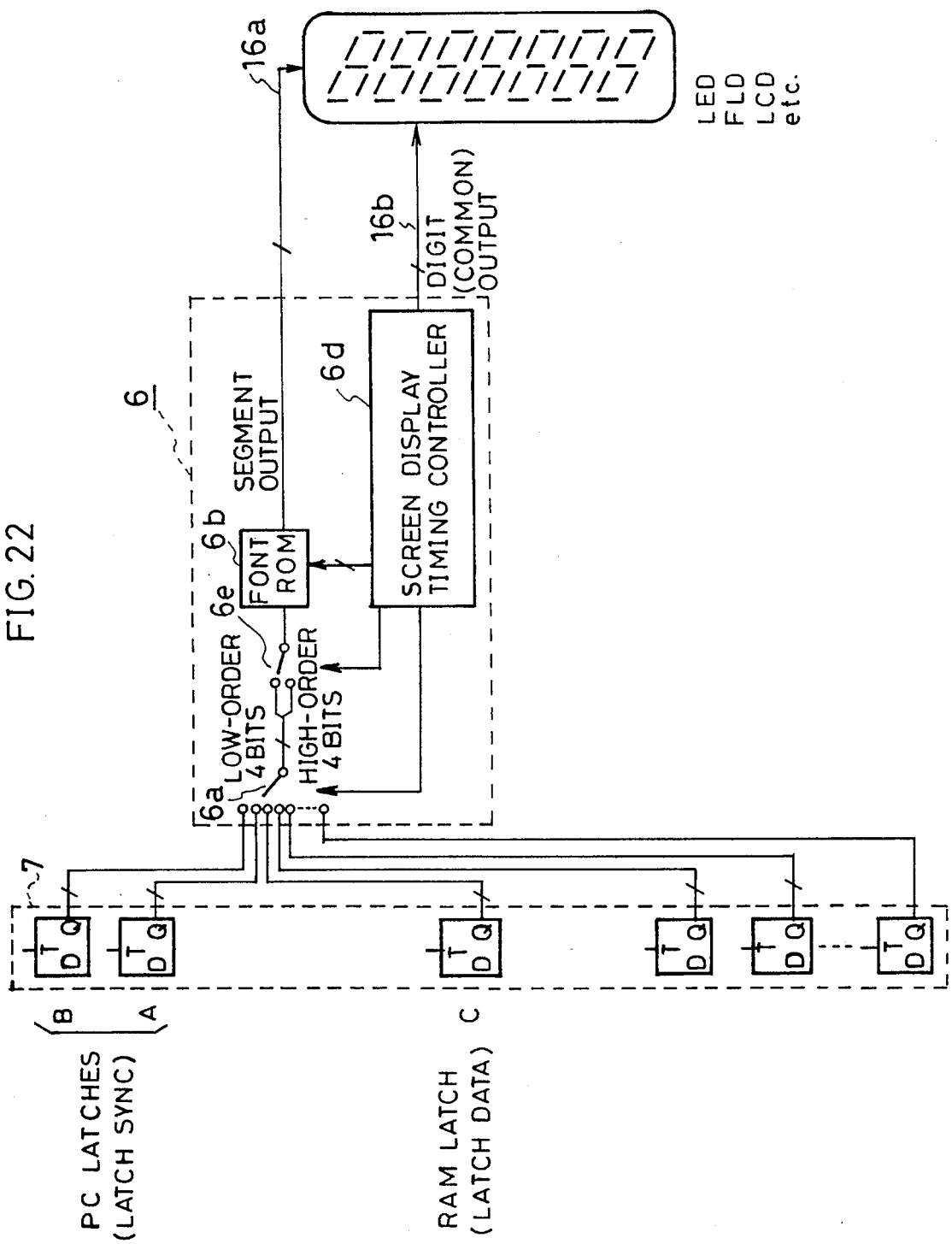
FIG. 22 is a block diagram of the configuration of the display controller according to Embodiment 5 of the invention.

FIG. 22 is a block diagram of the display controller and the display contents latch unit according to Embodiment 5 of the present invention. The microcomputer of the aforementioned Embodiment 1 incorporates the display controller for displaying data on a TV screen, but the microcomputer of this Embodiment 5 incorporates a display controller for displaying data on a display device using a surface emitting element such as an LED, FLD (fluorescent display tube) and LCD. In this Embodiment 5, all the elements excluding the display controller 6 are the same as those of Embodiment 1.

The display controller 6 receives the output signal of the display contents latch unit 7 and comprises the latch selection switch 6a for selecting one of the latch circuits of the display contents latch unit 7. The output signal (8 bits) of the latch selection switch 6a is split into two 4-bit data by the high-order/low-order selection switch 6e on a time-division basis and applied to the font ROM 6b. The output signal of the font ROM 6b is supplied to the outside of the microcomputer as a segment output 16a. The screen display timing controller 6d controls the latch selection switch 6a, the high-order/low-order selection switch 6e and the font ROM 6b and supplies a digit (common) output 16b to the outside of the microcomputer.

Figure 23I:
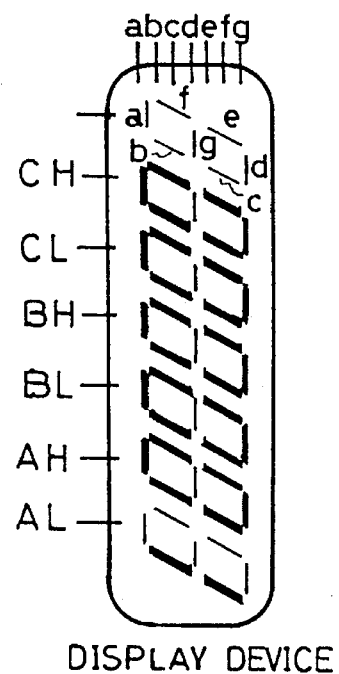
FIGS. 23(i)–23(ii) are a diagram showing exemplary display and the contents off the font ROM according to Embodiment 5.
Figure 23:
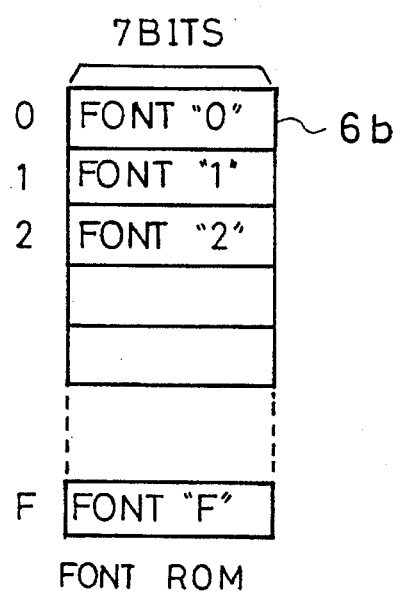

FIG. 23(i) shows a display example of Embodiment 5. The latch circuits A and B (LATCH SYNC) are represented by the last 4 digits and the latch circuit C (LATCH DATA) by the first two digits on a 7-segment multi-digit display device. FIG. 23(ii) shows the contents of the font ROM 6b which receives the 4-bit output signal of the high-order/low-order selection switch 6e of FIG. 14 as an address, generates 7-bit font data, and has a capacity of 16×7 bits.

Figure 24:
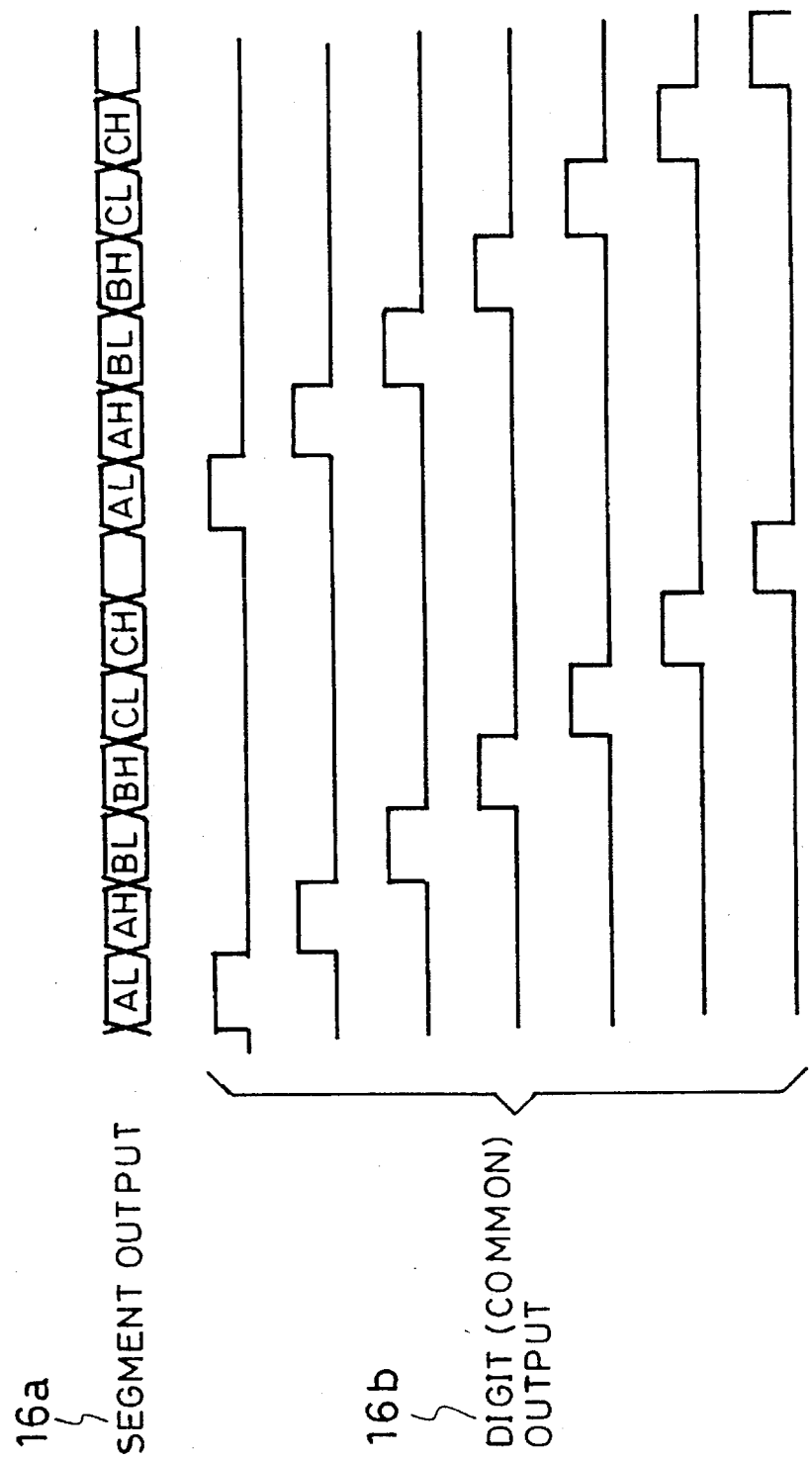
FIG. 24 is a timing chart showing the operation of Embodiment 5.
Figure 25:
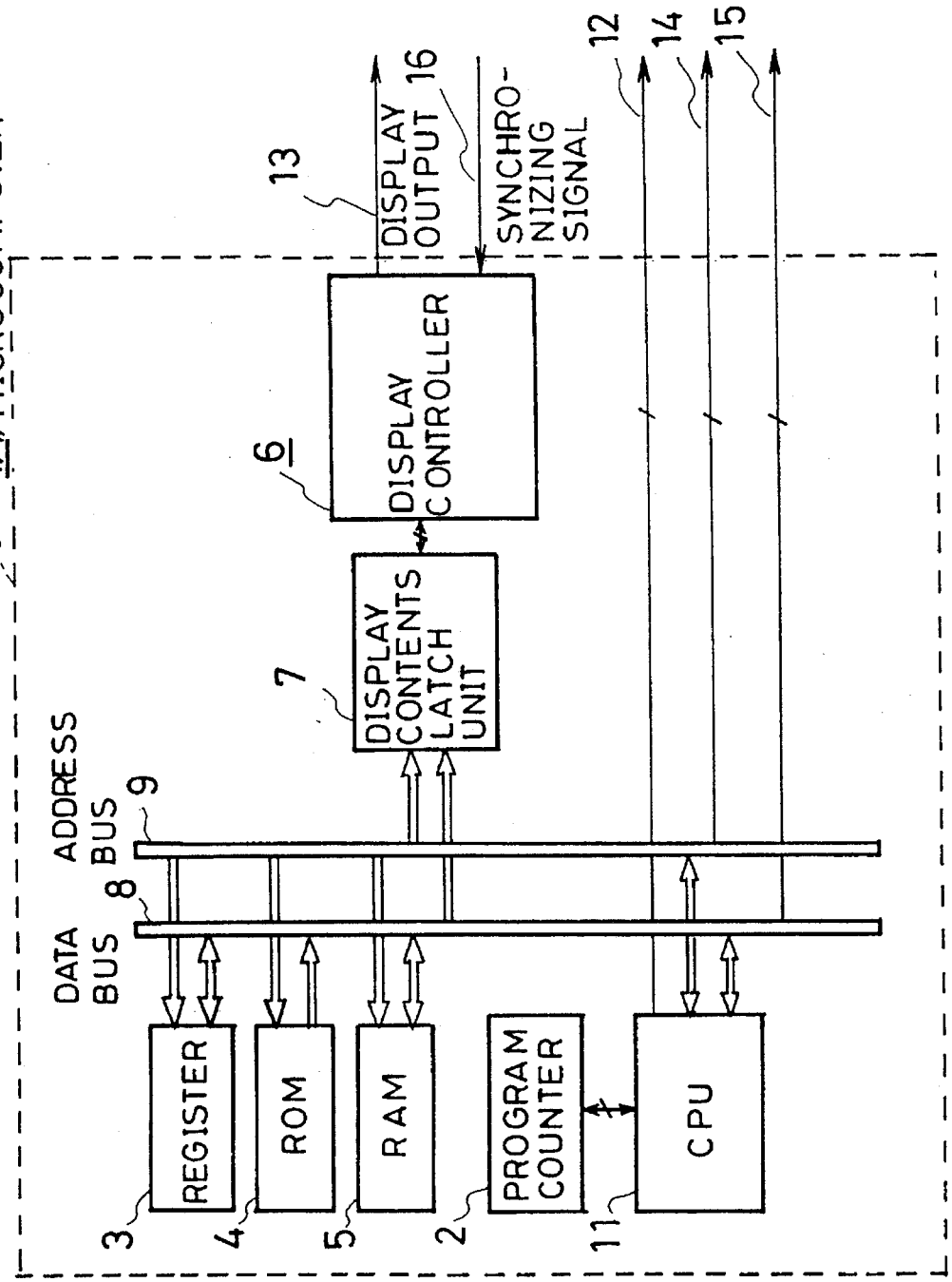
FIG. 25 is a block diagram of the internal configuration of a prior art single-chip microcomputer with built-in OSD.
Figure 26:
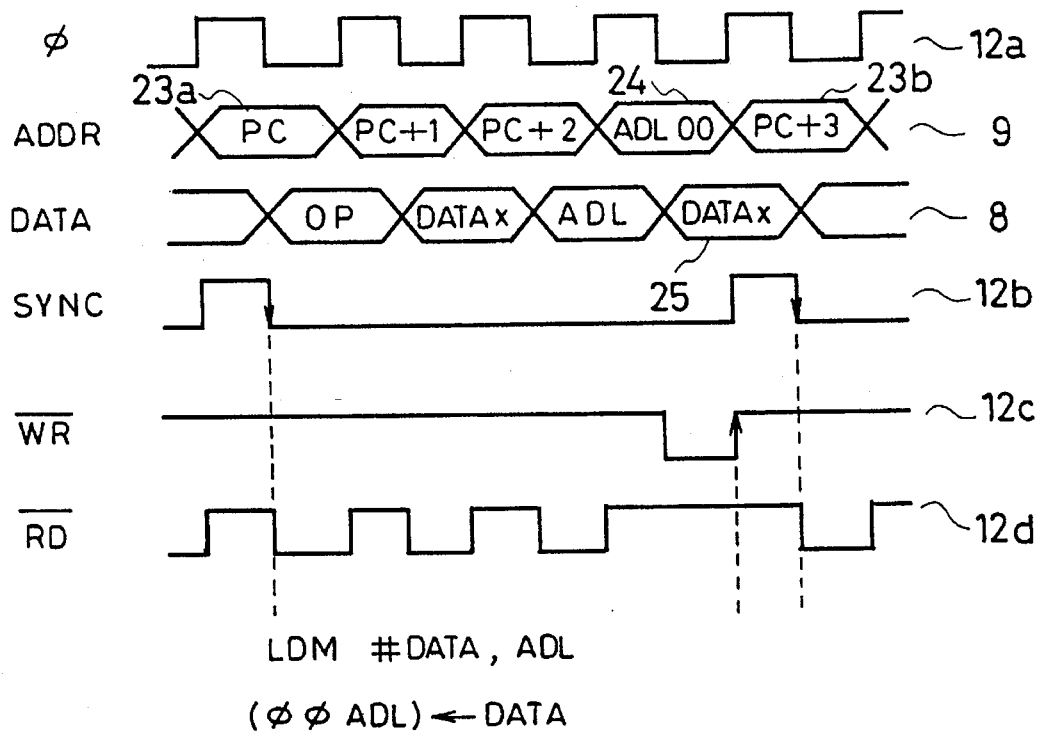
FIG. 26 is a timing chart showing the operation of the prior art.
Figure 27:
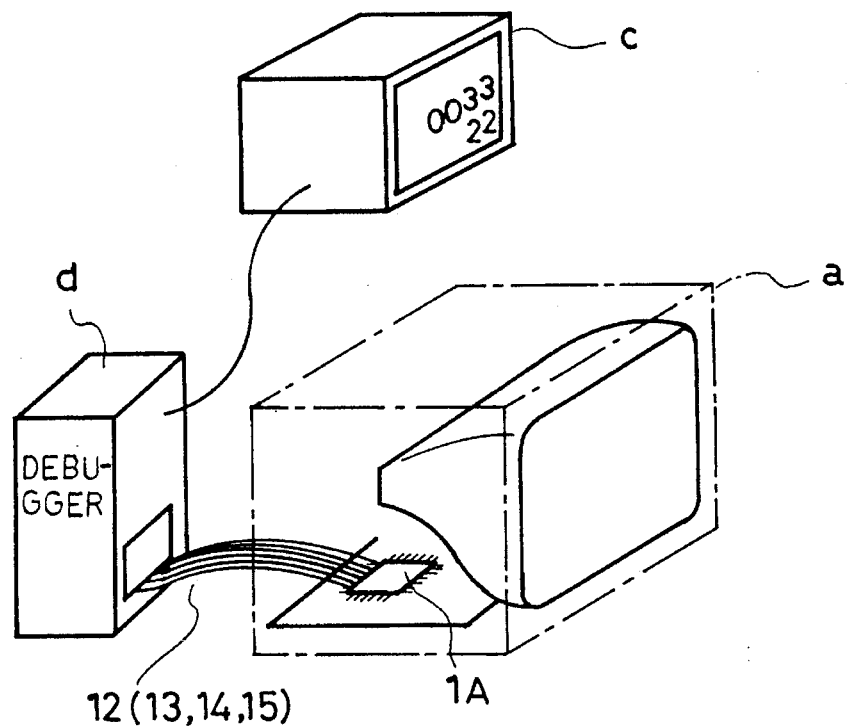
FIG. 27; is a diagram explaining the first method to identify RAM contents in the prior art.

FIG. 24 is a timing chart showing the operation of Embodiment 5. The screen display timing controller 6d of FIG. 22 generates the digit (common) output 16b one at a time sequentially. Immediately before scanning, a latch circuit within the display contents latch unit 7 and high-order or low-order data thereof to be supplied as the digit (common) output are selected by the latch selection switch 6a and the high-order/low-order selection switch 6e, respectively. The selected 4-bit data is converted into a 7-bit segment output signal by the font ROM 6b immediately and supplied to the outside of the microcomputer.

As described hereinabove, according to claim 1, since the microcomputer comprises the latch contents setting register for specifying contents to be monitored in the display contents latch unit and the latch timing controller controlled by the latch contents setting register, for supplying a latch timing signal to the display contents latch unit, the contents of the RAM or other element can be supplied to the outside of the microcomputer in the form of characters and graphs for observation, thereby making it easy to analyze and evaluate a finished program. Furthermore, the internal operation states of the microcomputer can be displayed on a display device such as a TV screen without changing the limited size of the microcomputer and with a small number of pins.

Moreover, compared with a microcomputer with built-in D/A converter, more data can be observed with a relatively small number of terminals as a plurality of internal data are supplied from the same output terminal of the display controller on a time-division basis. Particularly, more than 1000 bytes of data can be observed with a single terminal in the case of display on the TV screen. If data to be observed is of multiple bytes, it is easily observed although the number of digits of a numeral to be displayed is increased. The output of the microcomputer is a signal for displaying characters and numerals on a display device, thereby making possible easy observation.

According to claim 2, in addition to the elements and effects of the above-described claim 1, the internal states of the microcomputer can be monitored simultaneously with the display process of an application program when software is debugged since the microcomputer comprises debug instructing means for activating the latch contents setting register to instruct debugging. If this image is recorded with a VTR or other means and analyzed by frame-by-frame playback, the software can be debugged.

According to claim 3, since the microcomputer incorporates debug instructing means including a program for setting the test switch so as to specify a storage device having contents to be debugged and a monitor program for setting the storage address of the contents in the latch contents setting register, debugging can be instructed by a small program volume without a load placed on the CPU.

According to claim 4, since the microcomputer comprises an application program including a switch setting program for setting the test switch so as to specify a storage device having contents to be monitored and an instruction for writing program contents directly to the display contents latch unit as debug instructing means and writes the program contents directly to the display contents latch unit when the contents of an application program are debugged, the microcomputer can be used by the application program.

According to claim 5, the display contents latch unit can be used for different purposes according to the latch timing signal and the selection signal set by the debug instructing means: to write the contents of the program counter and the storage device by means of the latch control mean, and to write the contents of a program by means of an application program.

According to claim 6, since encoders for selecting and supplying some of a plurality of bits of the address bus or the data bus based on the output signal of the latch timing controller and supplying a fixed value for the other bits are provided between the display contents latch unit and the address bus and between the display contents latch unit and the data bus, the number of fonts stored in the font ROM can be reduced, thereby reducing costs of the microcomputer.

According to claims 7 and 8, since the display controller is composed of a latch selection switch for selecting and supplying one of a plurality of latch circuits, a high-order/low-order selection switch for selecting and supplying some bits of multi-bit digital data which is the output signal of this latch selection switch, a font ROM for using the output signal of the high-order/low-order selection switch as a part of an address, and a screen display timing controller for controlling the timings of the latch selection switch, the high-order/low-order selection switch and the font ROM to generate a display output, the internal operation states of the microcomputer can be displayed on a display device such as a TV screen with a small number of pins and without changing the limited size of the microcomputer.

According to claims 9 and 10, since an on-screen display controller for displaying data on a TV screen is used as the display controller and is composed of a latch selection switch for selecting and supplying one of a plurality of latch circuits of the display contents latch unit, a font ROM for receiving the output signal of this latch selection switch and generating parallel data, a parallel/serial converter for receiving and converting the parallel data as the output signal of the font ROM into serial data and supplying the serial data, a bar display counter for receiving the contents of the latch selection switch, counting down a clock signal and generating significant pulses until an underflow occurs, a screen display timing controller synchronous with the synchronizing signal supplied from the outside, for controlling the bar display counter and supplying a count-down clock signal, controlling the parallel/serial converter and supplying a shift clock signal, and controlling the latch selection switch and font ROM, and an OR gate for ORing the output signal of the parallel/serial converter and the output signal of the bar display counter and supplying a display output, the same effects as those of Embodiment 1 can be obtained and yet observation is possible without adding a D/A converter. Furthermore, since data to be observed are displayed on part of a display device of an application apparatus, the operation state of the application apparatus and the internal states of the microcomputer (such as a RAM) can be observed at the same time. Especially, in the case of display on a TV screen, when video signals are recorded by a VTR, correlation between the operation of the apparatus and the internal states of the microcomputer can be analyzed efficiently by playing back the tape frame by frame. Moreover, measurement instruments other than the application apparatus are not necessary for observation.

What is claimed is:

1. A microcomputer with built in debugging capability comprising an address bus, a data bus, a CPU connected to said address bus and said data bus, a register as a storage device, a ROM, a RAM, a program counter, a display contents latch unit including a plurality of latch circuits for latching digital values which appear on said address bus and said data bus, and a display controller for converting the contents of said display contents latch unit into character and graphic data and supplying the converted data to an external display, wherein the microcomputer further comprises:

a latch contents setting register, connected to said address bus and said data bus, in which the address of contents to be debugged stored in said storage device is set by the processing of said CPU for receiving debug instructing means and executing a predetermined instruction; and a latch timing controller, connected to said CPU, said address bus, said latch contents setting register and said display contents latch unit, for enabling said display contents latch unit to latch data when the data stored at the address set in said latch contents setting register appears on said data bus.

2. The microcomputer with built in debugging capability according to claim 1, wherein the debug instructing means is a program including a monitor program for enabling said CPU to execute the predetermined instruction and a switch setting program for setting a test switch so as to specify a storage device having contents to be debugged from among a plurality of storage devices.

3. The microcomputer with built in debugging capability according to claim 1, wherein said CPU receives the debug instructing means stored in said ROM.

4. The microcomputer with built in debugging capability according to claim 1, wherein said CPU receives the debug instructing means stored in a storage device external to the microcomputer.

5. The microcomputer with built in debugging capability according to claim 1, wherein latch control means for generating a latch trigger signal to said display contents latch unit based on a selection signal set by said CPU is connected to the trigger input of said display contents latch unit.

6. The microcomputer with built in debugging capability according to claim 1, wherein said display controller comprises a latch selection switch for selecting one of outputs from a plurality of latch circuits included in said display contents latch unit, a font ROM for using multi-bit digital data from the latch circuit selected by said latch selection switch as part of an address, and a screen display timing controller for controlling the timings of said latch selection switch and said font ROM for display output.

7. The microcomputer with built in debugging capability according to claim 6, wherein an encoder is provided between said address bus and said display contents latch unit and between said data bus and said display contents lath unit to select some of a plurality of bits of said address bus or said data bus so as to output a signal on said address bus or said data bus and a fixed value for the other bits.

8. The microcomputer with built in debugging capability according to claim 1, wherein said display controller comprises a latch selection switch for selecting one of outputs from a plurality of latch circuits included in said display contents latch unit, a high-order/low-order selection switch for selecting some bits of multi-bit digital data which is the output signal of the latch circuit selected by said latch selection switch, a font ROM for using the digital data selected by said high-order/low-order selection switch as part of an address, and a screen display timing controller for controlling the timings of said latch selection switch, said high-order/low-order selection switch and said font ROM for display output.

9. The microcomputer with built in debugging capability according to claim 8, wherein an encoder is provided between said address bus and said display contents latch unit and between said data bus and said display contents latch unit to select some of a plurality of bits of said address bus or said data bus so as to output a signal on said address bus or said data bus and a fixed value for the other bits.

10. The microcomputer with built in debugging capability according to claim 1, wherein said display controller is an on screen display controller for displaying data on a TV screen, which comprises a latch selection switch for selecting one of outputs from a plurality of latch circuits included in said display contents latch unit, a font ROM for receiving the output signal of said latch selection switch and outputting the signal as parallel data, a parallel/serial converter for receiving the parallel data as the output signal of said font ROM and converting it into serial data for output, a bar display counter for receiving and counting down contents to be input through said latch selection switch and outputting significant pulses until an underflow occurs, a screen display timing controller, synchronous with a synchronization signal supplied from the outside, for controlling said bar display counter, supplying a count-down clock signal, controlling said parallel/serial converter, supplying a shift clock signal, and controlling said latch selection switch and said font ROM, and OR gate means for ORing the output signal of said parallel/serial converter and the output signal of said bar display counter and supplying a display output to the outside.

11. A microcomputer with built in debugging capability comprising an address bus, a data bus, a CPU connected to said address bus and said data bus, a register as a storage device, a ROM, a RAM, a program counter, a display contents latch unit including a plurality of latch circuits for latching digital values which appear on said address bus and said data bus, and a display controller for converting the contents of said display contents latch unit into character and graphic data and supplying the converted data to an external display, wherein said CPU receives an application program including a debug program, executes a predetermined instruction and directly writes the contents of the application program to said display contents latch unit.

12. The microcomputer with built in debugging capability according to claim 11, wherein the application program further includes a switch setting program for setting a test switch so as to specify a storage device storing an application program to be debugged from among a plurality of storage devices.

13. The microcomputer with built in debugging capability according to claim 11, wherein said CPU receives an application program stored in said RAM.

14. The microcomputer with built in debugging capability according to claim 1, wherein latch control means for generating a latch trigger signal to said display contents latch unit based on a selection signal set by said CPU is connected to the trigger input of said display contents latch unit.

15. The microcomputer with built in debugging capability according to claim 1, wherein said display controller comprises a latch selection switch for selecting one of outputs from a plurality of latch circuits included in said display contents latch unit, a font ROM for using multi-bit digital data from the latch circuit selected by said latch selection switch as part of an address, and a screen display timing controller for controlling the timings of said latch selection switch and said font ROM for display output.

16. The microcomputer with built in debugging capability according to claim 15, wherein an encoder is provided between said address bus and said display contents latch unit and between said data bus and said display contents lath unit to select some of a plurality of bits of said address bus or said data bus so as to output a signal on said address bus or said data bus and a fixed value for the other bits.

17. The microcomputer with built in debugging capability according to claim 11, wherein said display controller comprises a latch selection switch for selecting one of outputs from a plurality of latch circuits included in said display contents latch unit, a high-order/low-order selection switch for selecting some bits of multi-bit digital data which is the output signal of the latch circuit selected by said latch selection switch, a font ROM for using the digital data selected by said high-order/low-order selection switch as part of an address, and a screen display timing controller for controlling the timings of said latch selection switch, said high-order/low-order selection switch and said font ROM for display output.

18. The microcomputer with built in debugging capability according to claim 17, wherein an encoder is provided between said address bus and said display contents latch unit and between said data bus and said display contents latch unit to select some of a plurality of bits of said address bus or said data bus so as to output a signal on said address bus or said data bus and a fixed value for the other bits.

19. The microcomputer with built in debugging capability according to claim 11, wherein said display controller is an on-screen display controller for displaying data on a TV screen, which comprises a latch selection switch for selecting one of outputs from a plurality of latch circuits included in said display contents latch unit, a font ROM for receiving the output signal of said latch selection switch and outputting the signal as parallel data, a parallel/serial converter for receiving the parallel data as the output signal of said font ROM and converting it into serial data for output, a bar display counter for receiving and counting down contents to be input through said latch selection switch and outputting significant pulses until an underflow occurs, a screen display timing controller, synchronous with a synchronization signal supplied from the outside, for controlling said bar display counter, supplying a count-down clock signal, controlling said parallel/serial converter, supplying a shift clock signal, and controlling said latch selection switch and said font ROM, and OR gate means for ORing the output signal of said parallel/serial converter and the output signal of said bar display counter and supplying a display output to the outside.

* * * * *